US011438186B2

(12) United States Patent
Wijnands et al.

(10) Patent No.: US 11,438,186 B2
(45) Date of Patent: *Sep. 6, 2022

(54) AREA-SPECIFIC BROADCASTING USING BIT INDEXED EXPLICIT REPLICATION

(71) Applicant: Cisco Technology, Inc., San Jose, CA (US)

(72) Inventors: Ijsbrand Wijnands, Leuven (BE); Pierre Pfister, Angers (FR); Neale D. R. Ranns, Basingstoke (GB); W. Mark Townsley, Paris (FR); Gregory J. Shepherd, Eugene, OR (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/834,860

(22) Filed: Mar. 30, 2020

(65) Prior Publication Data

US 2020/0228360 A1 Jul. 16, 2020

Related U.S. Application Data

(63) Continuation of application No. 15/347,443, filed on Nov. 9, 2016, now Pat. No. 10,637,675.

(51) Int. Cl.
*H04L 12/18* (2006.01)
*H04L 45/745* (2022.01)

(52) U.S. Cl.
CPC ...... *H04L 12/1845* (2013.01); *H04L 12/1886* (2013.01); *H04L 45/745* (2013.01); *H04L 2212/00* (2013.01)

(58) Field of Classification Search
CPC ............. H04L 12/1845; H04L 12/1886; H04L 45/745; H04L 2212/00
See application file for complete search history.

(56) References Cited

U.S. PATENT DOCUMENTS 5,088,091 A 2/1992 Schroeder
5,138,615 A 8/1992 Lamport
(Continued)

FOREIGN PATENT DOCUMENTS

CN 1754353 3/2006
CN 1792065 6/2006
(Continued)

OTHER PUBLICATIONS

Wijnands, Ijsbrand et al.; "Unicast Media Replication Fabric Using Bit Indexed Explicit Replication"; U.S. Appl. No. 16/834,551, filed Mar. 30, 2020; consisting of Specification, Claims, Abstract, and Drawings (65 pages).
(Continued)

*Primary Examiner* — Walter J Divito
*Assistant Examiner* — Anthony Luo

(57) ABSTRACT

Methods, network devices and computer readable media are disclosed relating to a communication network. In one embodiment, a method includes receiving a message comprising a message bit array. The message bit array identifies egress nodes for the message within a bit indexed explicit replication (BIER) domain of a communications network. A first bit position in the message bit array represents a first one or more of the egress nodes, and a bit value at the first bit position indicates that the message is to be forwarded to one of the first one or more of the egress nodes. The method further includes accessing a first forwarding table entry corresponding to the first bit position, determining whether the first bit position is an anycast bit position having multiple corresponding forwarding table entries, and forwarding the message to one of the first one or more of the egress nodes.

20 Claims, 14 Drawing Sheets

(56) References Cited

U.S. PATENT DOCUMENTS

| | | |
|---|---|---|
| 5,764,624 A | 6/1998 | Endo |
| 5,999,531 A | 12/1999 | Ferolito |
| 6,130,881 A | 10/2000 | Stiller |
| 6,147,976 A | 11/2000 | Shand |
| 6,148,000 A | 11/2000 | Feldman |
| 6,240,188 B1 | 5/2001 | Dondeti |
| 6,615,336 B1 | 9/2003 | Chen |
| 6,625,773 B1 | 9/2003 | Boivie et al. |
| 6,771,673 B1 | 8/2004 | Baum |
| 6,778,532 B1 | 8/2004 | Akahane |
| 6,873,627 B1 | 3/2005 | Miller |
| 7,111,101 B1 | 9/2006 | Bourke |
| 7,263,099 B1 | 8/2007 | Woo et al. |
| 7,281,085 B1 | 10/2007 | Garg |
| 7,519,733 B1 | 4/2009 | Thubert |
| 7,551,599 B2 | 6/2009 | Levit |
| 7,925,778 B1 | 4/2011 | Wijnands |
| 8,320,374 B2 | 11/2012 | de Heer |
| 8,325,726 B2 | 12/2012 | Baban et al. |
| 8,670,146 B1 | 3/2014 | Van Couvering |
| 8,774,179 B1 | 7/2014 | Gaggara |
| 8,787,400 B1 | 7/2014 | Barth |
| 8,830,826 B2 | 9/2014 | Chen |
| 8,848,728 B1 | 9/2014 | Revah |
| 8,880,869 B1 | 11/2014 | Shah |
| 8,890,903 B2 | 11/2014 | Russell |
| 8,942,256 B1 | 1/2015 | Barth |
| 9,065,766 B2 | 6/2015 | Matsuoka |
| 9,455,918 B1 | 9/2016 | Revah |
| 10,404,482 B2 | 9/2019 | Wijnands et al. |
| 10,461,946 B2 | 10/2019 | Wijnands et al. |
| 2002/0080798 A1 | 6/2002 | Hariguchi |
| 2002/0126661 A1 | 9/2002 | Ngai |
| 2002/0191628 A1 | 12/2002 | Liu et al. |
| 2003/0043802 A1 | 3/2003 | Yazaki et al. |
| 2003/0048779 A1 | 3/2003 | Doherty |
| 2003/0088696 A1 | 5/2003 | McCanne |
| 2003/0142685 A1 | 7/2003 | Bare |
| 2003/0210695 A1 | 11/2003 | Henrion |
| 2004/0027995 A1 | 2/2004 | Miller |
| 2004/0190526 A1 | 9/2004 | Kumar |
| 2004/0190527 A1 | 9/2004 | Okura |
| 2004/0240442 A1 | 12/2004 | Grimminger |
| 2004/0258066 A1 | 12/2004 | Chen |
| 2004/0264374 A1 | 12/2004 | Yu |
| 2005/0002371 A1 | 1/2005 | Andersen |
| 2005/0018693 A1 | 1/2005 | Dull |
| 2005/0080901 A1 | 4/2005 | Reader |
| 2005/0100016 A1 | 5/2005 | Miller |
| 2005/0157724 A1 | 7/2005 | Montuno |
| 2005/0169270 A1 | 8/2005 | Mutou |
| 2005/0181807 A1 | 8/2005 | Dowling |
| 2005/0232272 A1 | 10/2005 | Deng |
| 2006/0133298 A1 | 6/2006 | Ng |
| 2006/0182035 A1 | 8/2006 | Vasseur |
| 2006/0187817 A1 | 8/2006 | Charzinski |
| 2006/0280192 A1 | 12/2006 | Desanti |
| 2006/0291444 A1 | 12/2006 | Alvarez |
| 2007/0115968 A1 | 5/2007 | Brown |
| 2007/0127474 A1 | 6/2007 | Mirtorabi et al. |
| 2007/0189291 A1 | 8/2007 | Tian |
| 2008/0069125 A1 | 3/2008 | Reed |
| 2008/0159285 A1 | 7/2008 | De Heer |
| 2008/0165783 A1 | 7/2008 | Desanti |
| 2008/0194240 A1 | 8/2008 | Dowling |
| 2008/0212465 A1 | 9/2008 | Yan |
| 2008/0240105 A1 | 10/2008 | Abdallah |
| 2008/0316916 A1 | 12/2008 | Tazzari |
| 2009/0067348 A1 | 3/2009 | Vasseur |
| 2009/0185549 A1 | 7/2009 | Shon |
| 2009/0190587 A1 | 7/2009 | Zhao |
| 2009/0196289 A1 | 8/2009 | Shankar |
| 2009/0213735 A1 | 8/2009 | Check |
| 2009/0219817 A1 | 9/2009 | Carley |
| 2009/0225650 A1 | 9/2009 | Vasseur |
| 2009/0310610 A1 | 12/2009 | Sandstrom |
| 2010/0046400 A1 | 2/2010 | Wu |
| 2010/0046515 A1 | 2/2010 | Wong |
| 2010/0124225 A1 | 5/2010 | Fedyk |
| 2010/0191911 A1 | 7/2010 | Heddes |
| 2010/0290464 A1 | 11/2010 | Assarpour |
| 2011/0149973 A1 | 6/2011 | Esteve Rothenberg |
| 2011/0202761 A1 | 8/2011 | Sarela et al. |
| 2011/0228770 A1 | 9/2011 | Dholakia |
| 2011/0238816 A1 | 9/2011 | Vohra |
| 2011/0274112 A1 | 11/2011 | Czaszar |
| 2011/0299531 A1 | 12/2011 | Yu |
| 2012/0075988 A1 | 3/2012 | Lu |
| 2012/0099591 A1 | 4/2012 | Kotha |
| 2012/0106560 A1 | 5/2012 | Gumaste |
| 2012/0198064 A1 | 8/2012 | Boutros |
| 2012/0236857 A1 | 9/2012 | Manzella |
| 2012/0243539 A1 | 9/2012 | Keesara |
| 2013/0034097 A1 | 2/2013 | Dharmapurikar |
| 2013/0051376 A1 | 2/2013 | Hatashita |
| 2013/0100988 A1 | 4/2013 | Miyoshi |
| 2013/0107725 A1 | 5/2013 | Jeng |
| 2013/0114595 A1 | 5/2013 | Mack-Crane |
| 2013/0114619 A1 | 5/2013 | Wakumoto |
| 2013/0136117 A1 | 5/2013 | Schrum, Jr. |
| 2013/0136123 A1 | 5/2013 | Ge |
| 2013/0170450 A1 | 7/2013 | Anchan |
| 2013/0195001 A1 | 8/2013 | Liu |
| 2013/0201988 A1 | 8/2013 | Zhou |
| 2013/0308948 A1 | 11/2013 | Swinkels |
| 2013/0329728 A1 | 12/2013 | Ramesh |
| 2013/0336315 A1 | 12/2013 | Guichard |
| 2013/0343384 A1 | 12/2013 | Shepherd |
| 2014/0010074 A1 | 1/2014 | Ye |
| 2014/0010223 A1 | 1/2014 | Wang |
| 2014/0025821 A1 | 1/2014 | Baphna et al. |
| 2014/0043964 A1 | 2/2014 | Gabriel |
| 2014/0064081 A1 | 3/2014 | Morandin |
| 2014/0098813 A1 | 4/2014 | Mishra |
| 2014/0119191 A1 | 5/2014 | Onoue |
| 2014/0126575 A1 | 5/2014 | Janneteau |
| 2014/0160925 A1 | 6/2014 | Xu |
| 2014/0189174 A1 | 7/2014 | Ajanovic |
| 2014/0241357 A1 | 8/2014 | Liu et al. |
| 2014/0301390 A1 | 10/2014 | Scott |
| 2014/0362846 A1 | 12/2014 | Li |
| 2014/0369356 A1 | 12/2014 | Bryant |
| 2014/0376549 A1 | 12/2014 | Lu |
| 2015/0003458 A1 | 1/2015 | Li |
| 2015/0009823 A1 | 1/2015 | Ganga |
| 2015/0016469 A1 | 1/2015 | Ganichev |
| 2015/0023328 A1 | 1/2015 | Thubert et al. |
| 2015/0049760 A1 | 2/2015 | Xu |
| 2015/0078377 A1 | 3/2015 | Wijnands et al. |
| 2015/0078378 A1 | 3/2015 | Wijnands et al. |
| 2015/0078379 A1 | 3/2015 | Wijnands et al. |
| 2015/0078380 A1 | 3/2015 | Wijnands et al. |
| 2015/0081941 A1 | 3/2015 | Brown |
| 2015/0085635 A1 | 3/2015 | Wijnands et al. |
| 2015/0092546 A1 | 4/2015 | Baratam |
| 2015/0131658 A1 | 5/2015 | Wijnands et al. |
| 2015/0131659 A1 | 5/2015 | Wijnands et al. |
| 2015/0131660 A1* | 5/2015 | Shepherd ............... H04L 45/74 370/390 |
| 2015/0138961 A1 | 5/2015 | Wijnands et al. |
| 2015/0139228 A1 | 5/2015 | Wijnands et al. |
| 2015/0146526 A1 | 5/2015 | Kulkarni |
| 2015/0172190 A1 | 6/2015 | Song |
| 2015/0181309 A1 | 6/2015 | Wijnands et al. |
| 2015/0249587 A1 | 9/2015 | Kozat |
| 2015/0304450 A1* | 10/2015 | van Bemmel ...... H04L 12/4641 709/217 |
| 2015/0319086 A1 | 11/2015 | Tripathi |
| 2015/0334006 A1 | 11/2015 | Shao |
| 2016/0087890 A1 | 3/2016 | Przygienda |
| 2016/0105397 A1 | 4/2016 | Davis, Jr. et al. |
| 2016/0119159 A1 | 4/2016 | Zhao |
| 2016/0127139 A1 | 5/2016 | Tian |
| 2016/0127142 A1 | 5/2016 | Tian et al. |

(56) References Cited

U.S. PATENT DOCUMENTS

| | | | |
|---|---|---|---|
| 2016/0134518 A1 | 5/2016 | Callon | |
| 2016/0134535 A1 | 5/2016 | Callon | |
| 2016/0142248 A1 | 5/2016 | Thubert et al. | |
| 2016/0182353 A1 | 6/2016 | Garcia-Luna-Aceves | |
| 2016/0191372 A1 | 6/2016 | Zhang | |
| 2016/0205588 A1 | 7/2016 | Liu | |
| 2016/0218961 A1 | 7/2016 | Lindem | |
| 2016/0226725 A1 | 8/2016 | Iizuka | |
| 2016/0254987 A1 | 9/2016 | Eckert et al. | |
| 2016/0254988 A1 | 9/2016 | Eckert et al. | |
| 2016/0254991 A1 | 9/2016 | Eckert et al. | |
| 2016/0344616 A1 | 11/2016 | Roch | |
| 2017/0012880 A1 | 1/2017 | Yang | |
| 2017/0099232 A1 | 4/2017 | Shepherd | |
| 2017/0126416 A1 | 5/2017 | McCormick | |
| 2017/0142006 A1 | 5/2017 | Wijnands et al. | |
| 2017/0302566 A1 | 10/2017 | Zhang | |
| 2018/0048566 A1* | 2/2018 | Bannister | H04L 45/54 |
| 2018/0083790 A1 | 3/2018 | Wijnands et al. | |
| 2018/0091473 A1 | 3/2018 | Wijnands et al. | |
| 2018/0102965 A1 | 4/2018 | Hari | |
| 2018/0131532 A1 | 5/2018 | Wijnands et al. | |
| 2018/0205565 A1 | 7/2018 | Wijnands et al. | |
| 2018/0205636 A1 | 7/2018 | Hu | |
| 2018/0278470 A1 | 9/2018 | Wijnands et al. | |
| 2018/0287934 A1 | 10/2018 | Wang | |
| 2018/0287935 A1 | 10/2018 | Wang | |
| 2018/0309664 A1 | 10/2018 | Balasubramanian | |
| 2018/0316520 A1 | 11/2018 | Wijnands et al. | |
| 2019/0013964 A1 | 1/2019 | Wijnands | |
| 2019/0014034 A1 | 1/2019 | Allan | |
| 2019/0020574 A1 | 1/2019 | Eckert et al. | |
| 2019/0058606 A1 | 2/2019 | Wijnands et al. | |
| 2019/0075041 A1 | 3/2019 | Wang | |
| 2019/0116114 A1 | 4/2019 | Chen | |
| 2019/0215176 A1 | 7/2019 | Wijnands et al. | |
| 2019/0327168 A1 | 10/2019 | Eckert et al. | |
| 2019/0356500 A1 | 11/2019 | Wijnands et al. | |
| 2019/0386848 A1 | 12/2019 | Wang et al. | |
| 2020/0052918 A1 | 2/2020 | Wijnands et al. | |
| 2020/0067722 A1 | 2/2020 | Wijnands et al. | |
| 2021/0184982 A1 | 6/2021 | Zhang | |

FOREIGN PATENT DOCUMENTS

| | | |
|---|---|---|
| CN | 101242413 | 8/2008 |
| CN | 101385275 | 3/2009 |
| CN | 101572667 | 11/2009 |
| CN | 101689172 | 3/2010 |
| CN | 102025538 | 4/2011 |
| CN | 102577238 | 7/2012 |
| WO | WO 2007/095331 | 8/2007 |

OTHER PUBLICATIONS

Wijnands, Ijsbrand et al., "Bridging of Non-Capable Subnetworks in a Bit Indexed Explicit Replication"; U.S. Appl. No. 16/777,945, filed Jan. 31, 2020; consisting of Specification, Claims, Abstract, and Drawings (69 pages).
Aggarwal, R., et al., "BGP Encodings and Procedures for Multicast in MPLS/BGP IP VPNs," Internet Engineering Task Force (IETF), Request for Comments 6514, Feb. 2012, pp. 1-59.
Aguilar, L., "Datagram Routing For Internet Multicasting," SRI International, Menlo Park, California, ACM SIGCOMM Computer Communication Review Newsletter, vol. 14, Issue 2, Jun. 1984, pp. 58-63.
Artel Video Systems, White Paper; "The Broadcaster's Guide to SMPTE 2022: Applications in Video Contributiona and Distribution," Oct. 2014, pp. 1-7.
Bates, T. et al.; "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.
Boivie, Rick, et al., "Explicit Multicast (Xcast) Concepts and Options, draft-ooms-xcast-basic-spec-13.txt," Internet-Draft, Jul. 2007, pp. 1-34.
Cisco Systems, Inc., "Multi-Topology Routing," Feb. 2007, pp. 1-72.
Cisco Systems, Inc., White Paper, "Diffserv—The Scalable End-To-End Quality of Service Model," Aug. 2005, pp. 1-18.
Das, Kaushik, "IPv6 Header Deconstructed"; http://www.ipv6.com/articles/general/IPv6-Header.htm; Apr. 18, 2008; 2 pages.
Deering, S., Cisco Systems, Inc. and R. Hinden, Nokia;"Internet Protocol, Version 6 (IPv6)," Network Working Group, Request for Comments 2460, Dec. 1998, pp. 1-39.
Eckert, T., "Traffice Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Gharai, L. et al., "RTP Payload Format for Society of Motion Picture and Television Engineers (SMPTE) 292M Video," Network Working Group, Request for Comments 3497, Mar. 2003, pp. 1-12.
Hinden, R., Nokia and S. Deering, Cisco Systems, Inc.;"IP Version 6 Addressing Architecture," Network Working Group, Request for Comments 4291, Feb. 2006, pp. 1-25.
Kompella, K. et al., "The Use of Entropy Labels in MPLS Forwarding," Internet Engineering Task Force (IETF), Request for Comments 6790, No. 2012, pp. 1-25.
Kumar, N. et al., Cisco Systems, Inc., "OSPF Extension for Bit Index Explicit Replication, draft-kumar-ospf-bier-extension-00," Internet-Draft, May 19, 2014, pp. 1-7.
Kumar, N., et al., "BIER Use Cases, draft-kumar-bier-use-cases-00," Network Working Group, Internet-Draft, Oct. 25, 2014, pp. 1-7.
Laabs, Matthias, "SDI over IP—Seamless Signal Switching in SMPTE 2022-6 and a Novel Multicast Routing Concept," EBU Technical Review, 2014 Q4, pp. 1-7.
Li, Tony et al., "IGP Requirements for Traffic Engineering With MPLS, draft-li-mpls-igp-te-00.txt," Network Working Group, Internet-Draft, Feb. 1999, pp. 1-6.
Microsoft, "IPv6 Addressing (TechRef)"; Apr. 3, 2011; https://technet.microsoft.com/en-us/library/dd392266(v=ws.10).aspx; pp. 1-30.
Moy, J., Ascend Communications, Inc., "OSPF Version 2," Network Working Group, Request for Comments 2328, Apr. 1998, pp. 1-244.
Przygienda, T. et al., "M-ISIS: Topology (MT) Routing in Intermediate System to Intermediate Systems (IS-ISs)," Network Working Group, Request for Comments 5120, Feb. 2008, pp. 1-14.
Psenak, P. et al., "Multi-Topology (MT) Routing in OSPF," Network Working Group, Request for Comments 4915, Jun. 2007, pp. 1-20.
Psenak, P. et al., Cisco Systems; "OSPF Extensions for BIER, draft-psenak-ospf-bier-extensions-00," OSPF, Internet-Draft, Sep. 27, 2014, pp. 1-6.
Psenak, P. et al., Cisco Systems; "OSPF Extensions for BIER, draft-psenak-ospf-bier-extensions-01," OSPF, Internet-Draft, Oct. 24, 2014, pp. 1-8.
Psenak, P. et al., "OSPF Extensions For Segment Routing, draft-psenak-ospf-segment-routing-extension-05," Open Shortest Path First IGP, Internet-Draft, Jun. 2014, pp. 1-33.
Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.
Schulzrinne, H. et al., "RTP: A Transport Protocol for Real-Time Applications," Network Working Group, Request for Comments 3550, Jul. 2003, pp. 1-89.
Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.

(56) References Cited

OTHER PUBLICATIONS

Shen, N et al., "Calculating Interior Gateway Protocol (IGP) Routes Over Traffic Engineering Tunnels," Network Working Group, Request for Comments 3906, Oct. 2004, pp. 1-8.
SMPTE, "Beyond The Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE. "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Chen, Ran, et al., "YANG Data Model for BIER Protocol draft-chh-bier-bier-yang-00.txt", BIER WG, Internet-Draft, Internet-Draft, Jan. 7, 2016, pp. 1-13.
Kumar, N., et al., "BIER Ping and Trace," Network Working Group, Internet-Draft, Sep. 6, 2015, pp. 1-20.
Wijnands, Ijsbrand et al.; "Bit Indexed Explicit Replication for Layer 2 Networking"; U.S. Appl. No. 16/987,017, filed Aug. 6, 2020; consisting of Specification, Claims, Abstract, and Drawings 51 pages).
Wijnands, Ijsbrand et al.; "Bit Indexed Explicit Replication Using Multiprotocol Label Switching"; U.S. Appl. No. 16/876,217, filed May 18, 2020; consisting of Specification, Claims, Abstract, and Drawings 72 pages).

* cited by examiner

Bit-Indexed Routing Table A 302

| Router | BP | Neighbor |
|---|---|---|
| B | -- | B |
| C | -- | B |
| All Area 1 (via G) | 1 | B |
| All Area 2 (via H) | 2 | B |

*Fig. 3A*

Bit Indexed Forwarding Table A 304

| Neighbor | Neighbor bit array |
|---|---|
| B | 0011 |

*Fig. 3B*

Bit-Indexed Routing Table C 306

| Router | BP | Neighbor |
|---|---|---|
| All Area 1 (via G) | 1 | G |
| All Area 2 (via H) | 2 | H |

*Fig. 3C*

Bit Indexed Forwarding Table C 308

| Neighbor | Neighbor bit array |
|---|---|
| G | 0001 |
| H | 0010 |

*Fig. 3D*

Bit Indexed Forwarding Table G (Sat.) 310

| Neighbor | Neighbor bit array |
|---|---|
| M | 0011 |
| N | 1100 |

*Fig. 3E*

Bit Indexed Forwarding Table H (Sat.) 312

| Neighbor | Neighbor bit array |
|---|---|
| Q | 0111 |

*Fig. 3F*

Bit-Indexed Routing Table A 602

| Router | BP | Neighbor |
|---|---|---|
| B | -- | B |
| C | -- | B |
| All Area 1 (via G) | 1 | B |
| All Area 2 (via H) | 2 | B |
| All Area 3 (via G) | 3 | B |

*Fig. 6A*

Bit Indexed Forwarding Table A 604

| Neighbor | Neighbor bit array |
|---|---|
| B | 0111 |

*Fig. 6B*

| Bit-Indexed Routing Table C | | 606 |
|---|---|---|
| Router | BP | Neighbor |
| All Area 1 (via G) | 1 | G |
| All Area 2 (via H) | 2 | H |
| All Area 3 (via G) | 3 | G |

| Bit Indexed Forwarding Table C | 608 |
|---|---|
| Neighbor | Neighbor bit array |
| G | 0101 |
| H | 0010 |

| Bit Indexed Forwarding Table G (Sat.) | | | 610 |
|---|---|---|---|
| BP | Area | Neighbor | Neighbor bit array |
| 1 | 1 | M | 0011 |
| | | N | 1100 |
| 3 | 3 | D | 0111 |

| Broadcast Area Table G | | 702 |
|---|---|---|
| Bit Position | Area | Message bit array |
| 1 | 1 | 1111 |
| 3 | 3 | 0111 |

*Fig. 7A*

| Broadcast Area Table G | | 704 |
|---|---|---|
| Bit Position | Area | Neighbors |
| 1 | 1 | M, N |
| 3 | 3 | D |

*Fig. 7B*

| Broadcast Area Table G | | 902 |
|---|---|---|
| Bit Position | Area | Message bit array |
| 1 | 1 | 1010 |
| 3 | 1 | 0101 |

*Fig. 9A*

| Broadcast Area Table G | | 904 |
|---|---|---|
| Bit Position | Area | Neighbors |
| 1 | 1 | M |
| 3 | 1 | N |

*Fig. 9B*

| Bit-Indexed Routing Table A | | | 1102 |
|---|---|---|---|
| Router | BP | Anycast BP? | Neighbor |
| B | | | B |
| C | | | B |
| All Area 1 (via G or K) | 1 | Y | B |
| All Area 2 (via H or L) | 2 | Y | B |

*Fig. 11A*

| Bit-Indexed Routing Table C | | | 1104 |
|---|---|---|---|
| Router | BP | Anycast BP? | Neighbor |
| All Area 1 (via G) | 1 | Y | G |
| All Area 1 (via K) | 1 | Y | K |
| All Area 2 (via H) | 2 | Y | H |
| All Area 2 (via L) | 2 | Y | L |

*Fig. 11B*

| Bit-IndexedForwarding Table C | | | 1106 |
|---|---|---|---|
| BP | Anycast BP? | Neighbor | Neighbor bit array |
| 1 | Y | G | 0001 |
| 1 | Y | K | 0001 |
| 2 | Y | H | 0010 |
| 2 | Y | L | 0010 |

*Fig. 11C*

AREA-SPECIFIC BROADCASTING USING BIT INDEXED EXPLICIT REPLICATION

CROSS-REFERENCE TO RELATED APPLICATIONS

The present patent application is a continuation of U.S. patent application Ser. No. 15/347,443, filed on Nov. 9, 2016 entitled "Area Specific Broadcasting Using Bit Indexed Explicit Replication" which is incorporated by reference herein in its entirety and for all purposes.

TECHNICAL FIELD

This disclosure relates generally to network communications and more particularly to broadcasting within specified areas of subdivided networks.

BACKGROUND

Network nodes forward data. Network nodes may take the form of one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

The processes involved in forwarding messages in networks may vary depending on the forwarding configuration used. Overall forwarding configurations include unicast, broadcast, and multicast forwarding. Unicast is a method of point-to-point communication most often used when a particular node (known as a source) wishes to send data to another particular node (known as a receiver) and is not concerned with sending the data to multiple receivers. Broadcast is method used when a source wishes to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features and advantages made apparent to those skilled in the art, by referencing the accompanying drawings.

FIG. 3A illustrates an example of a bit indexed routing table for a node in the network of FIG. 2.

FIG. 3B illustrates an example of a bit indexed forwarding table for a node in the network of FIG. 2.

FIG. 3C illustrates an example of a bit indexed routing table for a node in the network of FIG. 2.

FIGS. 3D through 3F illustrate examples of bit indexed forwarding tables for nodes in the network of FIG. 2.

FIG. 6A illustrates an example of a bit indexed routing table for a node in the network of FIG. 5.

FIG. 6B illustrates an example of a bit indexed forwarding table for a node in the network of FIG. 5.

FIGS. 7A and 7B illustrate embodiments of a broadcast area table for a node in the network of FIG. 5.

FIGS. 9A and 9B illustrate embodiments of a broadcast area table for a node in the network of FIG. 8.

FIGS. 11A and 11B illustrate examples of bit indexed routing tables for nodes in the network of FIG. 10.

FIG. 11C illustrates an example of a bit indexed forwarding table for a node in the network of FIG. 10.

DETAILED DESCRIPTION

Overview

Figure 1A:
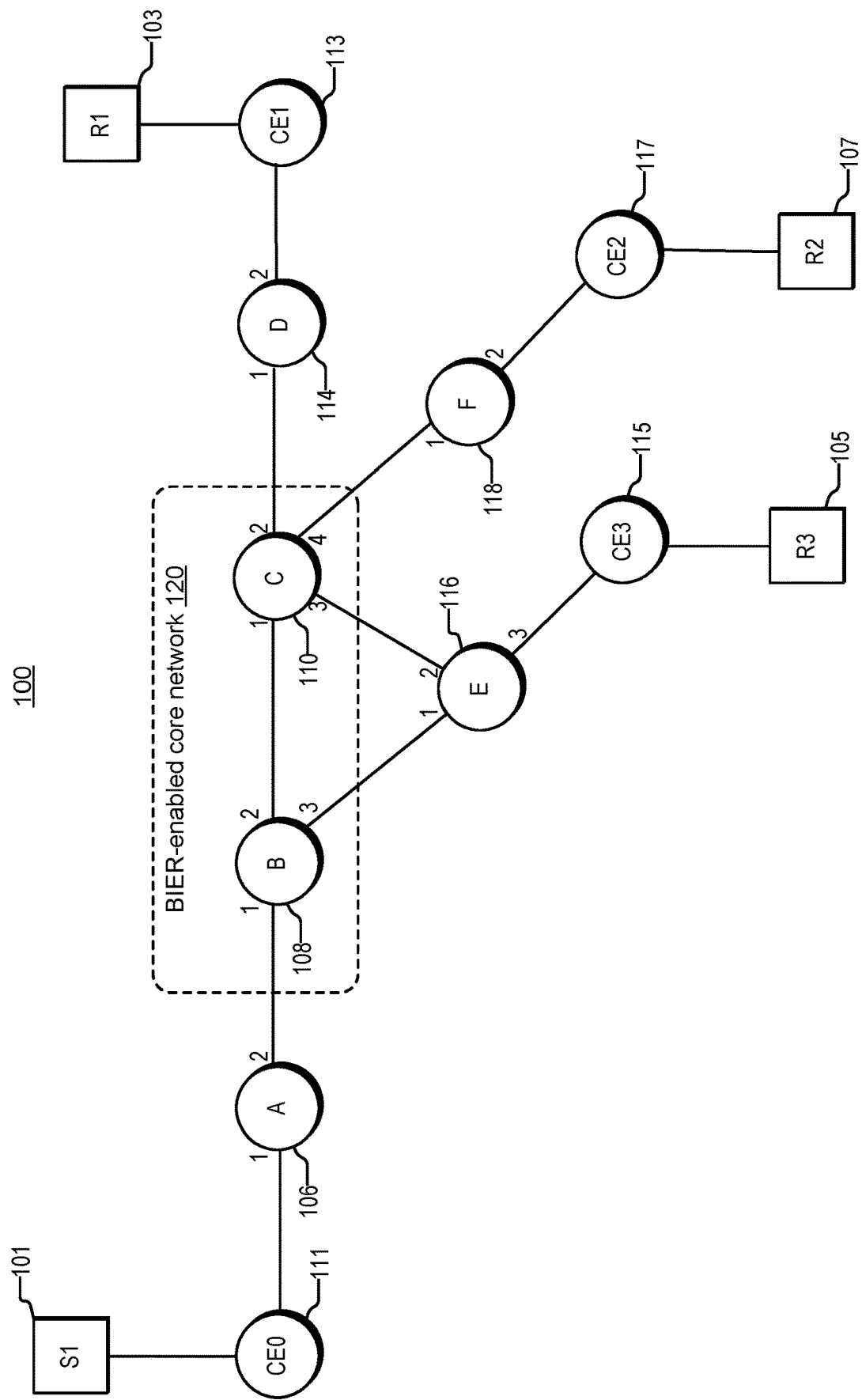
FIG. 1A is a simplified block diagram illustrating certain components of an example network.

Methods, network devices and computer readable media are disclosed relating to a communication network. In one embodiment, a method includes receiving a message comprising a message bit array. The message bit array identifies egress nodes for the message within a bit indexed explicit replication (BIER) domain of a communications network. A first bit position in the message bit array represents a first one or more of the egress nodes, and a bit value at the first bit position indicates that the message is to be forwarded to one of the first one or more of the egress nodes. The method further includes accessing a first forwarding table entry corresponding to the first bit position, determining whether the first bit position is an anycast bit position having multiple corresponding forwarding table entries, and forwarding the message to one of the first one or more of the egress nodes.

Multicast

Multicast transmission delivers multicast packets (packets that traditionally include information identifying a multicast group, such as a multicast group address) from a source to multiple receivers without unduly burdening the source. Although some of the discussion in this disclosure is in terms of packets, it should be understood that the disclosures made herein may also be applicable to other types of network messages, such as datagrams or data frames. Generally speaking, a multicast receiver is a host (such as a computing device or application) that has subscribed to a multicast group. Instead of the source replicating a multicast packet and sending a copy of the multicast packet to each receiver, the source sends a single copy of a multicast packet and multicast-enabled routers (or, more generally, nodes) replicate the packet at the point(s) where paths to various receivers diverge. Multicast routing protocols enable multicast transmission (i.e., one-to-many connections and many-to-many connections) by replicating a multicast packet close to the destination of that multicast packet, obviating the use of multiple unicast connections for the same purpose. This saves network bandwidth and improves throughput.

Typical multicast routing protocols require that each node's multicast forwarding table include, for example, information that maps source and group identifiers for each multicast flow to the interfaces over which the node must forward a packet replica for that group, and the interface over which a packet for that group should properly arrive. The multicast forwarding tables maintained by each multicast-enabled node can become quite large in networks with many multicast sources, many multicast groups, or both. Maintaining such multicast forwarding tables imposes limitations on network scalability.

Bit Indexed Explicit Replication (BIER)

In a "stateless multicast" technique known as Bit Indexed Explicit Replication (BIER), the amount of state information within a multicast network is reduced. In BIER forwarding, receiver information is encoded in the packet rather than looked up in tables at each node based on multicast source and group information. Specifically, the receiver information is encoded in a bit array carried by the packet. Generally speaking, each node associated with a multicast receiver is assigned a bit position in the bit array. A node connected to a receiver may also be referred to as a "receiver node" or a "destination node" herein. The value of the bit at a given bit position indicates whether the receiver node corresponding to that bit position is an intended receiver, or destination, for the multicast packet carrying the bit array.

In forwarding a BIER multicast packet containing a packet bit array (or, more generally, a BIER multicast message containing a message bit array), a BIER-enabled node determines whether any intended destination nodes for the packet are also reachable nodes from the BIER-enabled node. This is done using a bit indexed forwarding table stored at the BIER-enabled node, the forwarding table having an entry for each of the BIER-enabled node's neighbor (directly connected next-hop) nodes. In an embodiment, the entry for each neighbor node includes a neighbor bit array with the same mapping of bit positions to destination nodes as that of the packet bit array. In a neighbor bit array, however, the value of the bit at a given bit position indicates whether the corresponding receiver node is reachable from the neighboring node associated with the forwarding table entry containing the neighbor bit array. Whether a node is "reachable," for purposes of BIER forwarding, from a neighboring node depends on whether the neighboring node is included in the shortest path to the destination node, as determined through an interior gateway protocol (IGP) used in the network. A message bit array may also be called a "bit string" herein, and a neighbor bit array may be called a "bit mask."

If comparison of the packet bit array of an incoming BIER packet with a neighbor bit array in a forwarding table entry shows that at least one intended destination node for the multicast packet is reachable via a neighbor node, a replica of the multicast packet is forwarded to the neighbor node, using routing information from the forwarding node's unicast routing table. This process is repeated for forwarding table entries associated with any other neighbor nodes, and each forwarded replica packet is in turn handled in a similar manner when received by the respective BIER-enabled neighbor node. In this manner the multicast packet is replicated and forwarded as needed to reach the intended destinations. In some embodiments, modifications are made to a packet bit array during the forwarding process, either as a packet bit array is compared to neighbor bit arrays in successive forwarding table entries at the node, or before a replica packet carrying a packet bit array is forwarded to a neighbor node, or in both situations. Such modifications can prevent looping and replication of packets.

Figure 1B:
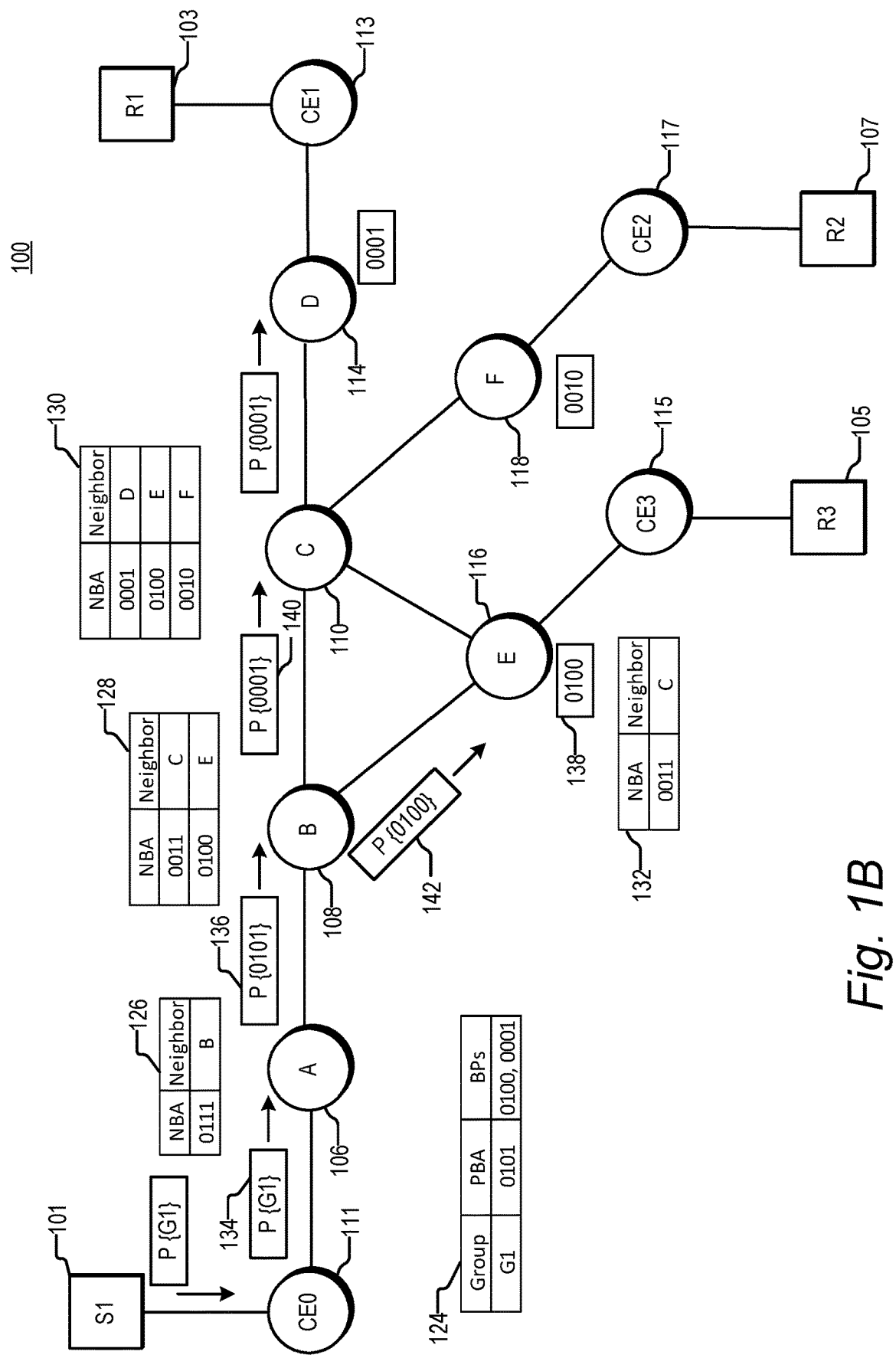
FIG. 1B is a diagram illustrating BIER forwarding through an example network.

Configuration and operation of a BIER-enabled network is described further with reference to FIGS. 1A and 1B. FIG. 1A shows an example network 100. Network 100 includes BIER-enabled nodes 106, 108, 110, 114, 116 and 118. BIER-enabled nodes are configured to forward packets using BIER. For example, BIER-enabled nodes are configured to store and use bit indexed forwarding tables, as explained further below. A BIER-enabled node may also be referred to as a "bit-forwarding router" (BFR) herein. Although "node" and "router" may be used interchangeably herein, the described nodes may in some embodiments be implemented using switches or other devices capable of carrying out the described functions. The BIER-enabled nodes in FIG. 1A form a provider network, or domain. Such a provider network could be employed by an Internet service provider to transport packets to customers. The domain includes core nodes 108 and 110, and provider edge nodes 106, 114, 116, and 118. The provider edge nodes are coupled to customer edge nodes 111, 113, 115, and 117. Hosts 101, 103, 105, and 107 are coupled to the customer edge nodes. In the embodiment of FIG. 1A, host 101 is a multicast source, while hosts 103, 105 and 107 are configured as multicast receivers, or subscribers.

Each of the BIER-enabled nodes 106, 108, 110, 114, 116 and 118 has interfaces that are identified as shown. For example, BIER-enabled node 108 has three interfaces designated 1-3, respectively. Each BIER-enabled node is assigned a unique identifier or routable address known as a router identifier (RID). The RID can be implemented as, for example, an internet protocol (IP) address, prefix, or loopback address. The RID may also be referred to as a "BFR-Prefix" herein. In network 100 and other network diagrams described herein, these unique router identifiers are represented by capital letters such as "A" through "F". Network 100 and the other BIER-enabled networks described herein are not limited to any particular version of IP or to any particular routing or routed protocol at all. Each BIER-enabled node advertises or floods the routable address to all other BIER-enabled nodes in network 100. Each BIER-enabled node builds a unicast topology of the BIER-enabled nodes in network 100 using the advertised routable addresses.

BIER-enabled node 106 is configured as an ingress router for multicast data packets. A BIER-enabled ingress router may also be referred to as a "bit-forwarding ingress router" (BFIR) herein. The ingress router is coupled, via customer edge node 111, to source 101. Multicast data packets from source 101 enter the BIER network via the ingress router (BIER-enabled node 106). Each of BIER-enabled nodes 114, 116, and 118 is configured as an egress router. The egress routers can be connected (directly or via customer edge routers) to hosts, such as receivers, or other networks. An egress router is a BIER-enabled node that is the last BIER-enabled node on a path between a source and a receiver. As such, an egress router is a destination node when forwarding using BIER. The egress router may be a provider edge node that is coupled to the receiver either directly or indirectly (e.g., through a non-BIER-enabled customer edge node). A BIER-enabled egress router may also be referred to as a "bit-forwarding egress router" (BFER) herein.

In an embodiment, receiver information is included in the packet by assigning each edge router in a BIER network a bit position (BP) within a packet bit array carried by the packet (or, more generally, a message bit array carried by a network message). An edge router assigned a bit position in this manner is also associated with the same relative bit position in a neighbor bit array stored in a bit indexed forwarding table at a BIER-enabled node. Either or both of the packet bit array and neighbor bit array may also be referred to as a bit mask (BM) herein. In some embodiments, the packet bit array is referred to as a bit string or BitString and the neighbor bit array is referred to as a bit mask. As used herein, the term bit array, bit string or bit mask refers to a set of bits that has a fixed or variable length.

A subset of the BIER-enabled nodes in network 100 is designated as BIER-enabled core network 120. As used herein, "BIER-enabled core network" refers to a central subnetwork of BIER-enabled nodes within a BIER network, where the nodes in the core network are capable of BIER forwarding, but are neither ingress nor egress nodes of the BIER network.

Bit Indexed Routing and Forwarding Tables

Each BIER-enabled node in the BIER network uses the BPs and router identifiers (RIDs) of the other BIER-enabled nodes to generate one or more bit indexed routing tables (BIRTs) and bit indexed forwarding tables (BIFTs). A bit indexed routing table is a table that stores BP-to-router identifier mappings. In an embodiment, the BIER-enabled nodes learn about the BP-to-router ID mappings through advertisements sent by the BIER-enabled nodes having assigned bit positions.

In response to a BP being assigned to an egress router, the egress router advertises its BP along with its router identifier to some or all of the other nodes in the BIER network. In one embodiment, the ER advertises its BP via an interior gateway protocol (IGP). Within an autonomous system, an IGP is used for exchanging network topology information between nodes (all nodes, whether BIER-enabled or not). An autonomous system, or routing domain, as used herein refers to a collection of interconnected network nodes under a common administration for purposes of network configuration. There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols. Messages called advertisements are used in IGPs to exchange information. Nodes in an IP network automatically exchange network topology information through IGP advertisements.

In an embodiment, ISIS and/or OSPF protocols can be modified to assist in distributing BP-to-router ID mappings through the BIER network using link state updates. In OSPF, such a link state update is called a link-state advertisement (LSA). Certain types of LSAs are "opaque" LSAs which are forwarded through the network even by nodes that do not themselves have the capability to use the information in the LSA. Such opaque LSAs may be useful in networks having both BIER-enabled and non-BIER enabled nodes. Other flooding mechanisms to distribute the information are possible. All BIER-enabled nodes in a BIER network, not just the egress routers, also flood their respective router identifiers, which are used in building network topology and forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the usual topology information exchanged through IGP advertisements, and the state information maintained on a per-group basis in traditional multicast.

Using a mechanism such as IGP advertisements, each BIER-enabled node receives BP-to-router identifier mappings and stores them in a BIRT. Other information can be included in the BIRT, depending on the particular BIER implementation. In an embodiment using an MPLS implementation of BIER, for example, the BIER-enabled node also includes at least one label range in the BIRT for each router ID.

Using the router identifiers, a BIER-enabled node performs a recursive lookup in unicast routing tables to identify a directly connected next hop BIER-enabled node (referred to herein as a neighbor) on the shortest path from the BIER-enabled node toward the BIER-enabled node associated with the BP, and the interface via which the neighbor is reachable. In one embodiment, the neighbor is the next hop on a shortest path towards the egress router that originated the advertisement of the bit position. Each BIER-enabled node translates its BIRT(s) into one or more bit indexed forwarding tables (BIFTs) used for forwarding of BIER messages. A BIFT maps each neighbor node (and/or the egress interface for reaching the neighbor node) to the bit positions of destination nodes reachable via that neighbor node.

BIER Packet Forwarding Example

To illustrate the operation of BIER packet forwarding, network 100 of FIG. 1A is shown again with additional annotation in FIG. 1B. In the embodiment of FIG. 1B, BIER-enabled node 114 (an egress router) signals to BIER-enabled node 106 (an ingress router) that BIER-enabled node 114 is interested in receiving packets associated with a given multicast group or flow. BIER-enabled node 116 likewise signals BIER-enabled node 106 that BIER-enabled node 116 is interested in the same multicast group. In an embodiment, this signaling is done via an "overlay" mechanism not explicitly shown in FIG. 1B, such as an exterior gateway protocol or a control protocol used by a network controller. BIER-enabled node 106 updates an entry in group membership table (GMT) 124 (or creates one if one does not already exist) for the multicast group and updates a packet bit array (PBA) in the entry by setting bits corresponding to BIER-enabled nodes 114 and 116. The bit position for node 116 is represented by bit string 138 having bit 3 of the four bits (counting from the least significant bit at the right) set to 1. Similarly, the bit position assigned to node 114 is represented by the bit string 0001 having bit 1 set. Assuming that only BIER-enabled nodes 114 and 116 are interested in the flow, the PBA includes set bits for each of these two bit positions, for an array of {0101}.

In the simplified example of FIG. 1B, the packet bit array and neighbor bit arrays used are four bits long, which is sufficient to represent the three egress routers in network 100, each connected to a respective one of the three receivers in the network. In this example, a "1" value in a bit position of a packet bit array indicates that the corresponding destination node is an intended destination for the packet. An alternative convention for the value at a bit position could be used in another embodiment, but in any case the value of the bit at a bit position in a packet bit array indicates whether the corresponding destination node is an intended destination. In FIG. 1B, icons representing multicast packets, such as original packet 134 and BIER-encapsulated packet 136, are superimposed onto the diagram of network 100. The icons represent snapshots taken at successive times as the packet (or replicas of the packet) moves through the network in the direction of the arrows. At one point in time, for example, packet 136 is moving from node 106 ("A") to node 108 ("B"). At a subsequent point in time, packet 136 has been replicated and forwarded on, so that packet replicas 140 and 142 are moving from node B toward nodes 110 ("C") and 116 ("E"), respectively.

BIER-enabled node (and ingress router) 106 is configured to receive a multicast data packet 134 addressed to the multicast group or flow G1 (e.g., from source 101 via customer edge node 111). In the embodiment of FIG. 1B, BIER-enabled node 106 uses the multicast group address and/or source address included in the multicast data packet to access its GMT and select a packet bit array associated with the multicast group. After selecting a PBA that corresponds to the multicast group from GMT 124, BIER-enabled node 106 encapsulates the packet bit array into the multicast data packet, resulting in BIER packet 136. Ingress node 106 also identifies the neighbors to which packet 136 will be forwarded. In an embodiment, the neighbors are identified using the bit indexed forwarding table (BIFT) of node 106, a portion 126 of which is shown in FIG. 1B. In a further embodiment, this involves performing an AND operation between the packet bit array and each neighbor bit array (NBA) in BIER-enabled node 106's BIFT. In this example, there is only one entry in the BIFT and the entry corresponds to BIER-enabled node 108. This means that the shortest path from BIER-enabled node 106 to all three of the egress routers in network 100 runs through BIER-enabled node 108. Since the result of the AND is TRUE for neighbor B (BIER-enabled node 108), BIER-enabled node 106 forwards the multicast data packet to BIER-enabled node 108. This forwarding may involve other information from the BIFT for node 106 not shown in portion 126, such as egress interface information.

In an embodiment, in response to receiving the multicast data packet, BIER-enabled node 108 performs an AND between the packet bit array in the multicast data packet, {0101}, and the neighbor bit array in each entry in its BIFT (a portion 128 of which is shown). The result for neighbor C is TRUE so BIER-enabled node 108 forwards replica 140 of the multicast data packet to BIER-enabled node 110. In the embodiment of FIG. 1B, BIER-enabled node 108 modifies the packet bit array in the multicast data packet it forwards, as discussed further below. The result for neighbor E is also TRUE, so BIER-enabled node 108 replicates the multicast data packet and forwards replica 142 of the multicast data packet to BIER-enabled node 116, which is an egress router. In the example of FIG. 1B, a "1" value in a bit position of a neighbor bit array indicates that the destination node assigned to the bit position is reachable from the neighboring node corresponding to the forwarding table entry containing the neighbor bit array. An alternative convention for the value at a bit position could be used in another embodiment, but in any case the value of the bit at a bit position in a neighbor bit array indicates whether the corresponding destination node is a reachable destination from the neighbor associated with the neighbor bit array.

In an embodiment, BIER-enabled node 110, in response to receiving a copy of the multicast data packet, performs an AND between the packet bit array in the multicast data packet, {0001}, and the neighbor bit array in each entry in its BIFT (portion 130 of which is shown). The result for neighbor D is TRUE so BIER-enabled node 110 forwards the multicast data packet to BIER-enabled node 114 which is an egress router. The result for neighbor F is FALSE, so BIER-enabled node 110 refrains from forwarding the multicast data packet to BIER-enabled node 118. In this way the multicast data packet travels from the ingress router (BIER-enabled node 106) through the BIER network to the two egress routers that signaled an interest in the multicast group (BIER-enabled nodes 114 and 116).

In the embodiment of FIG. 1B, each time the BIER packet is forwarded using an entry in a bit indexed forwarding table, the packet bit array in the forwarded packet is altered to clear any set bits in bit positions corresponding to nodes not reachable from the neighbor that the packet is being forwarded to. For example, when the multicast packet arrives at node B, it has an incoming packet bit array of {0101}. Comparison of the packet bit array to the neighbor bit arrays shown in BIFT portion 128 shows that the set first (rightmost) bit of the PBA corresponds to a destination node reachable through neighbor C, while the set third bit corresponds to a node reachable through neighbor E. The packet bit array in the packet forwarded to neighbor C accordingly has only the first bit set, and the PBA in the packet forwarded to neighbor E has only the third bit set. This modification of the packet bit array when a BIER packet is forwarded prevents looping and duplication by ensuring that a BIER-enabled node forwards a given multicast data packet only once based on a given bit position. This alteration of the packet bit array to clear bits that are not also set in the neighbor bit array can be interpreted as a form of masking by the neighbor bit array.

In addition to alteration of the packet bit array sent with a forwarded packet (which may also be called a forwarded packet bit array herein), the packet bit array used at a BIER-enabled node for comparison to each neighbor bit array within a BIFT may be modified each time a packet is sent. Specifically, if a packet is sent as a result of comparing the incoming PBA to a neighbor bit array in a bit indexed forwarding table at the node, the PBA used for comparison to the next neighbor bit array in the forwarding table is altered to remove the destinations of the just-sent packet as intended destinations. In one embodiment, this alteration includes performing a bitwise AND operation between the incoming PBA and the inverse of the neighbor bit array corresponding to the neighbor node to which a packet was just sent. This has the effect of clearing those bits corresponding to bit positions which were set in the forwarded PBA of the outgoing packet. This alteration can prevent sending of a duplicate packet in a case for which multiple forwarding table entries have an NBA with the same bit set. This can happen, for example, in equal cost multi-path (ECMP) arrangements.

The above-described modifications to the packet bit array are not needed in embodiments in which the network has a loop-free topology. One example of a loop-free topology is a point-to-multipoint (P2MP) label switched path (LSP) in a network employing multiprotocol label switching (MPLS). Modifications to the packet bit array may also be omitted in embodiments in which some amount of looping and/or duplication can be tolerated.

Bit Array Length

The length of the bit arrays used in a particular BIER network—i.e., the number of bits in the array—can be statically configured or dynamically assigned and distributed through the BIER network. In an embodiment, the length is determined in view of the size and capabilities of the network. One factor affecting the length of a message bit array that can be carried by a message is the type of encapsulation used to include the message bit array in the message.

In some embodiments, existing encapsulations such as Internet Protocol version 6 (IPv6) or Multiprotocol Label Switching (MPLS) can be adapted or extended to carry BIER-related information. For example, a packet bit array is written to the destination address field of an IPv6 header in one embodiment. In another embodiment, a packet bit array is written to one or more IPv6 extension headers. In an embodiment employing MPLS encapsulation, a message bit array is included in a stack of MPLS labels. In another MPLS embodiment, the message bit array may be encoded outside of the MPLS label structure, between the MPLS label stack and the payload of the message. Although use of existing encapsulations to encode BIER-related information has advantages in terms of leveraging existing network infrastructure, existing encapsulations may impose limitations on the size of a message bit array. In one currently-used MPLS implementation, for example, the message bit array is limited to 256 bits. As another example, one currently-envisioned IPv6 implementation limits the packet bit array to approximately 100 bits.

Limitation of the size of a message bit array, whether arising from the message encapsulation used or from other network factors, in turn limits the size of a BIER network, since at least one bit position is needed for each receiver or destination node being addressed. One way that the number of receivers in a BIER network can be increased beyond the network's bit array length is by associating a "set identifier" with the bit array. The receivers to be addressed can be grouped into sets of, say, 256 receivers (or whatever number can be addressed by the bit array). The same bit position can then be used to represent one receiver in, for example, Set 0 and a different receiver in Set 1. In BIER networks employing a set identifier, a message may carry multiple message bit arrays, one for each set identifier. Similarly, the bit indexed forwarding tables at each node can include multiple neighbor bit arrays associated with each neighbor, one bit array for each set identifier. This use of multiple bit arrays results in multiple copies of a message being created and forwarded by each BIER-enabled node, assuming that a message is directed to receivers in each set. Especially at ingress nodes of BIER networks, and especially in broadcast or near-broadcast applications, significant loading can result from the need to generate multiple copies of each message.

An alternative to the use of sets in addressing a larger number of receivers than the number of bits in the bit array is to subdivide a BIER network into multiple areas. In such an embodiment, each area can include as many receivers as can be addressed using the number of bit positions available in the network's bit array. This means that a receiver in one area of the network may be assigned the same bit position as another receiver in a different area of the network. In an embodiment, area border routers (ABRs) between the areas of the network function in part as BIER ingress routers to the BIER network within a given area. When an ABR receives a multicast message via BIER forwarding through a first area that the ABR is connected to, the ABR determines the multicast group associated with the bit array of the received message. In an embodiment, this is done by removing the BIER encapsulation of the received message and inspecting the underlying message to find, for example, a group address from an IP destination address field. The ABR then determines the BIER bit array needed to forward the message into a second area that the ABR is connected to. To find the BIER bit array for the second area, the ABR consults a table similar to GMT 124 of FIG. 1B, in which BIER bit arrays for a given area are mapped to multicast group identifiers. The need to maintain multicast group state at each ABR in a multi-area network, rather than just at the ingress node as in a single-area BIER network, may add complexity to the network and weaken the BIER-enabled benefit of a network largely free of multicast-related state.

Area-Specific Broadcasting

In embodiments described herein, a multi-area BIER network is configured such that broadcast to all receivers within certain areas is acceptable. This allows multicast group state at ABRs of the network to be eliminated. In an embodiment, one BIER bit position in a backbone area of a network is mapped to a broadcast to all receivers within a satellite area of the network. In an alternative embodiment, one BIER position in a backbone area is mapped to a broadcast to all receivers within a designated subset of the receivers in a satellite area.

Figure 2:
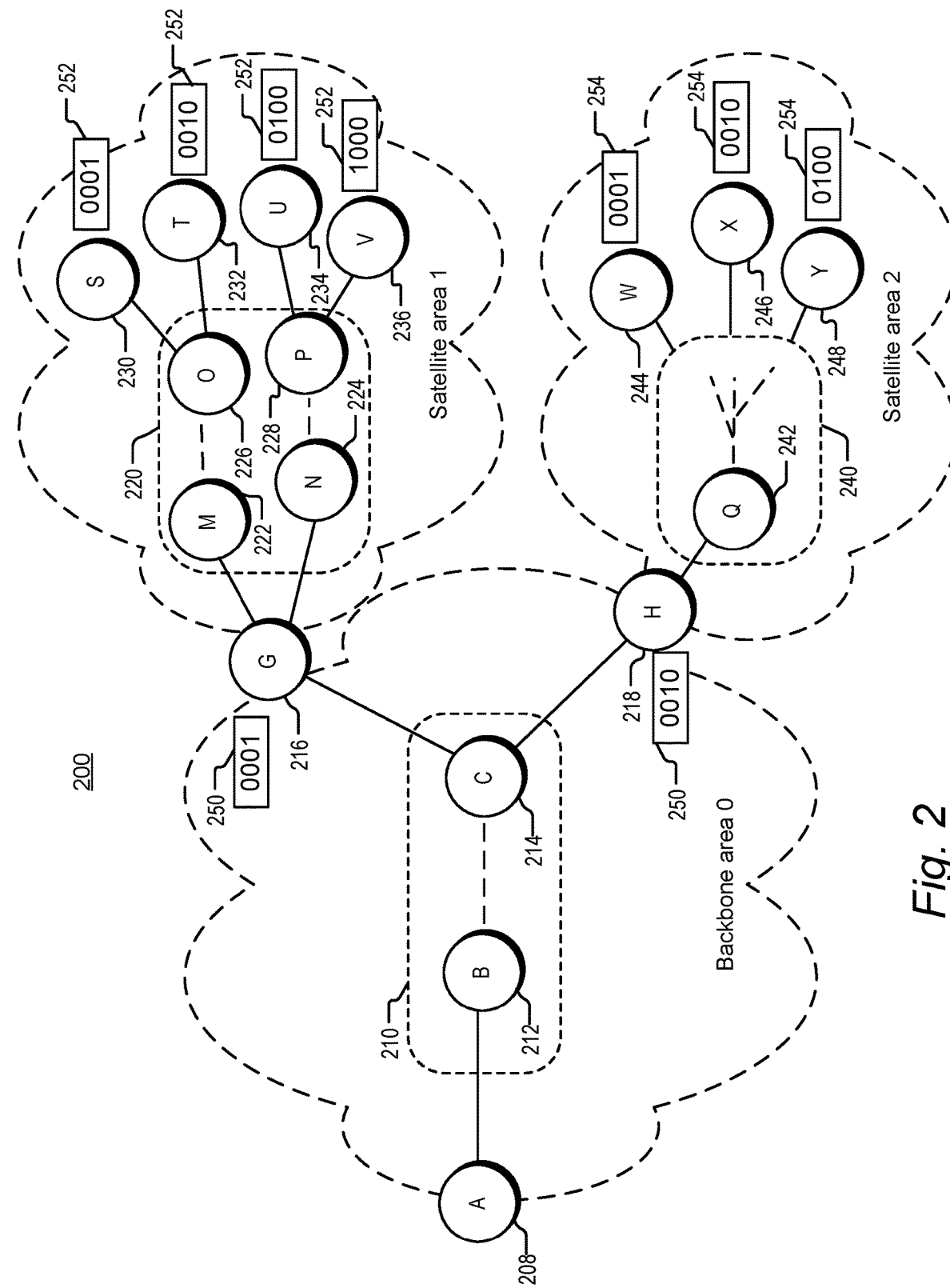
FIG. 2 is a simplified block diagram illustrating certain components of an embodiment of a multi-area network as described herein.

An example of a multi-area BIER network is illustrated in FIG. 2. BIER-enabled network 200 is subdivided into backbone area 0 and satellite areas 1 and 2. In an embodiment, satellite areas 1 and 2 correspond to geographic locations, such as New York City for area 1 and San Francisco for area 2. Backbone area 0 includes BIER ingress node 208, with a unique router ID "A". Area 0 also includes BIER-enabled core network 210, which is similar in nature (though not necessarily in specific configuration) to BIER-enabled core network 120 of network 100, shown in FIG. 1A. In the embodiment of FIG. 2, core network 210 includes node 212 (router ID "B") serving as a neighbor node to ingress node A. Core network 210 also includes node 214 (router ID "C"), which is a neighbor of area border routers 216 ("G") and 218 ("H") at the edge of backbone area 0. The dashed line between core routers B and C indicates that these routers are connected via a core BIER network having details not shown. In other words, routers B and C could be directly connected, or could be connected via one or more additional core routers. In other embodiments, a BIER-enabled core network such as core network 210 can include many additional routers, just one router, or even be absent entirely from backbone area 0. The number of routers shown in FIG. 2 has been kept relatively low for ease of explanation; actual networks may include a larger number of areas and/or a larger number of routers per area.

Area border routers G and H are each assigned an area-0 bit position 250, with ABR G assigned bit position "1" and ABR H assigned bit position "2". In an embodiment, these bit positions, and any other BIER bit positions described herein, are assigned by an external authority via, for example, a network controller. Such a network controller may be a controller host external to the data path network 200. Alternatively, ingress node 208 may be configured to manage certain control functions such as bit position assignment. In still other embodiments, bit positions may be assigned through a manual configuration process or through another mechanism such as derivation of a bit position from an identifier for the router.

As shown in FIG. 2, ABR G connects backbone area 0 of network 200 to satellite area 1. Satellite area 1 contains BIER-enabled core network 220, which is similar in nature to core network 210 of backbone area 0. Core network 220 includes routers 222 ("M") and 224 ("N"), which are neighbors to ABR G. As indicated by the dashed lines within core network 220, router M is connected by the core network to router 226 ("O"), which is a neighbor of area 1 egress routers 230 ("S") and 232 ("T"). Egress routers S and T are each assigned an area-1 bit position 252, with router S assigned bit position "1" and T assigned bit position "2". It is noted that these bit position values are the same as those assigned to ABRs G and H, and that this is permissible because the bit positions are assigned in different areas of the network. Router N is connected within core network 220 to router 228 ("P"), which is a neighbor of egress routers 234 ("U") and 236 ("V"). Egress routers U and V are also assigned area-1 bit positions 252, with router U assigned bit position "3" and router V assigned bit position "4" within area 1.

Area border router H of network 200 connects backbone area 0 to satellite area 2. Satellite area 2 contains BIER-enabled core network 240, which is similar in nature to core networks 220 of area 1 and 210 of area 0. Core network 240 includes router 242 ("Q"), which is a neighbor of ABR H. The dashed lines within core network 240 indicate that router Q is connected, by a portion of the core network not explicitly shown, to area 2 egress routers 244 ("W"), 246 ("X") and 248 ("Y"). Egress routers W, X and Y are each assigned an area-2 bit position 254. Routers W, X and Y are assigned area-2 bit positions "1", "2" and "3", respectively.

The configuration and operation of network 200 can be further explained with reference to examples of BIER routing and forwarding tables shown in FIGS. 3A through 3F. FIGS. 3A and 3B include examples of bit indexed routing table and forwarding table portions for ingress node 208 of backbone area 0. Ingress node 208 of area 0 is similar in some ways to ingress node 106 of BIER network 100. As the ingress node to a BIER network, node 208 imposes a message bit array on incoming messages so that they can be forwarded through area 0 using BIER. Node 208 therefore includes state information used to determine what bit array to attach to a give message. In an embodiment, this state information is in the form of a group membership table similar to table 124 of FIG. 1B. In such an embodiment, multicast addresses such as an IP multicast addresses may be mapped to respective message bit arrays to be imposed by ingress node 208. In an embodiment, membership in such a multicast group is not receiver-driven as for conventional multicast. Instead, satellite areas such as areas 1 and 2 may be assigned to groups by some external authority such as a content provider.

The state information used to impose a bit array may be communicated to ingress node 208 by an external authority, as noted above, or may be manually configured. The state information is in some embodiments provided using a network controller. Instead of a multicast address, some other indicator, encoded in a message header using, for example, a designated field or set of flags, may be used in some embodiments to identify the bit array that should be imposed on an incoming message. In some embodiments, the ingress node's function of imposing a BIER bit array on a message is carried out by a content source or a transceiver associated with a content source, with the BIER-encapsulated message then forwarded into area 0 by the ingress node.

The bit positions in the message bit array imposed at ingress node 208 are area-0 bit positions. In an embodiment, area-0 bit positions are assigned to ABRs, such as ABRs G and H, for linking area 0 to respective satellite areas. Area-0 bit positions may in some embodiments also be assigned to egress routers within area 0 similar to the egress routers of network 100 described above. FIG. 3A shows an example of a bit indexed routing table (BIRT) portion for ingress node 208. As noted above in the description of FIGS. 1A and 1B, BIER-enabled nodes generate BIRTs using bit position and router ID information advertised by each BIER-enable node. In the case of a BIER network subdivided into areas, advertisement of bit positions is done within the advertising router's own area, while an ABR is configured to advertise, into each area it is connected to, information relevant to that area. In an embodiment, the advertisement is done via an IGP which has been modified or extended to provide for advertisement of BIER information. In an alternative embodiment, BIER information is disseminated through a network controller in communication with each of the BIER-enabled nodes. In a further embodiment, BIER information could be distributed through communications initiated by a controller, rather than through communications initiated by individual BIER-enabled nodes.

In the embodiment of FIG. 3A, BIRT 302 for ingress node 208 includes a "Router" column identifying nodes within area 0 from which router IDs have been received. The "Bit Position (BP)" column of table portion 302 includes area-0 bit positions for those nodes that have them. The "Neighbor" column identifies the neighbor node to router A via which each router is reachable. The neighbor is typically determined using a shortest-path-first (SPF) algorithm in the usual manner of a unicast routing table. (Router B is of course the only neighbor available for ingress node 208 in the simplified example of network 200.) Alternatively, the egress interface from node 208 leading to neighbor B could be identified instead of or in addition to the neighbor node.

Instead of entries associated with ABRs G and H per se, BIRT 302 includes entries for all of area 1, via ABR G, and all of area 2, via ABR H. This reflects the nature of the bit positions assigned to ABRs used in the area-specific broadcasting embodiments described herein. In the embodiment of FIG. 2, a message sent to ABR G using BIER bit position "1" is forwarded by ABR G to each of the receivers in area 1. The area-based nature of these bit positions is included in the Router column of BIRT 302 for purposes of explanation. This information could be included in an actual bit indexed routing table in various other ways known to one of ordinary skill in the art in view of this disclosure. For example, additional columns in table 302 could be used to indicate that a router is an ABR or that a bit position is associated with a satellite area.

In an embodiment, information regarding the area-based nature of bit positions for ABRs G and H is received by ingress node 208 in the same manner that the router IDs and bit positions for ABRs G and H are received. For example, such information may be included along with other BIER-related information in IGP advertisements having BIER extensions. Alternatively, information regarding the area-based nature of the ABR bit positions can be communicated via a network controller. In one embodiment employing a network controller, the area-based nature of the ABR bit positions is reflected in information maintained by the controller, but not provided to ingress node 208. In such an embodiment, BIRT 302 would have similar entries for ABRs G and H as for any other router in area 0 having an assigned bit position. Bit indexed routing table 302 may also include other information not shown in FIG. 3A, such as egress interface information and other information that might also appear in a traditional routing table.

An example of a bit indexed forwarding table (BIFT) for ingress node 208 is shown in FIG. 3B. As noted above in the discussion of FIG. 1A, each BIER-enabled node creates one or more bit indexed forwarding tables using the information in its bit indexed routing table. A BIFT maps neighbor nodes to the bit positions of receivers reachable via the neighbor nodes. In the case of BIFT 304 of FIG. 3B, the only neighbor node within area 0 is node 212 (router B). The forwarding table includes a neighbor bit array for neighbor B, where the neighbor bit array has set bits corresponding to the bit positions of ABRs G and H, which are both reachable via router B. Representation of the bit positions of reachable nodes as set bits in a neighbor bit array can be convenient for comparison of the neighbor bit array to a message bit array of a message to be forwarded: the comparison can be done using a logical AND of the message bit array and the neighbor bit array. If the result of the logical AND is nonzero, there is at least one destination node for the message being forwarded that is also reachable on a shortest path via the neighbor node. In that case, a replica of the message is forwarded to the neighbor node. In an alternative embodiment, the bit position(s) of any destination nodes reachable via the neighbor node are encoded in a different way than with a neighbor bit array.

A message forwarded by ingress node 208 to router B (node 212) is in turn forwarded by router B, using a bit indexed forwarding table at router B, and then forwarded through BIER-enabled core network 210 to node 214 (router C). An example of a bit indexed routing table generated by router C is shown in FIG. 3C. Bit indexed routing table portion 306 of FIG. 3C is similar to BIRT 302 of FIG. 3A, except for including ABRs G and H as neighbors rather than router B. Routing table portion 306, along with the other routing and forwarding table portions described herein, is designed to illustrate routing and forwarding involved in one-way distribution of messages from area 0 ingress router A toward satellite area egress routers S through Y. As such, the table portions generally include the neighbor nodes useful for transmission in this direction. In an embodiment, a larger portion of BIRT 306 of FIG. 3C would also include routers A and B in the router column, as well as a bit position (not shown in FIG. 2) for router A, and a neighbor node (also not shown in FIG. 2) back into BIER-enabled core network 210 through which nodes B and A would be reached from router C.

Although routing table 306 of FIG. 3C identifies the satellite areas reached using ABRs G and H, such area information would not necessarily need to be included in the bit indexed routing table for a core BIER node such as node 214. In an alternative embodiment, BIRT 306 maps ABRs (and neighbor nodes) G and H to their corresponding bit positions, but does not include information about the satellite areas reachable using the ABRs. In such an embodiment, a standard BIER-enabled router may be sufficient for use within BIER-enabled core network 210 of area 0. In an embodiment, node 214 does not incorporate satellite area information into its bit indexed routing table, even when the area information is received in advertisements from other nodes.

An example of a bit indexed forwarding table portion for node 214 is shown in FIG. 3D. Forwarding table portion 308 maps neighbor nodes G and H to the bit positions of egress nodes reachable through each neighbor (in this case the neighbor nodes themselves). According to standard BIER forwarding practice, a copy of an incoming message is forwarded to ABR G if the message bit array carried by the message has a set bit in bit position "1". Similarly, a copy of the message is forwarded to ABR H if the message bit array has a set bit in bit position "2".

Because ABRs G and H are egress nodes of backbone area 0, the area-0 related BIER encapsulation of a message arriving at either of these ABRs is removed. A new BIER bit array for the appropriate satellite area is then added to the message before it is forwarded into the satellite area. The operation of ABRs G and H is unlike that of ABRs in a standard multi-area BIER network, however, in that ABRs G and H do not need state information in the form of a multicast group membership table in order to encapsulate messages for forwarding into the satellite areas. This is because network 200 has the property that a message sent to ABR G is to be sent to every egress router in satellite area 1, and a message sent to ABR H is to be sent to every egress router in satellite area 2. Application of the satellite area message bit array can therefore be as simple as applying a bit array having every bit set (all "1"s), assuming the convention used herein in which a set bit corresponds to a desired destination for the message. If any of the set bits correspond to bit positions not actually assigned to a receiver, those bit positions would not be used in message forwarding because they would be eliminated during the process of comparison to the ABR's bit indexed forwarding table for the satellite area. Alternatively, the neighbor bit arrays of the ABR's forwarding table could be combined using a logical OR, and the result used as the message bit array. Messages encapsulated with a new message bit array as described above would then be forwarded in the standard BIER manner using the ABR's BIFT for the satellite area.

In an alternative embodiment of operation by ABRs G and H, application of the new message bit array and BIER forwarding into the satellite area are combined. In this embodiment, the ABR's bit indexed forwarding table for the satellite area is accessed. For every neighbor node in the table via which at least one egress node is reachable, a replica of the message is forwarded to that neighbor, with that neighbor's neighbor bit array from the forwarding table used as the message bit array for the message replica. This combined method sends the message to every egress node in the satellite area, while saving the step of attaching a message bit array and comparing that message bit array to the neighbor bit array in the forwarding table.

An example of a bit indexed forwarding table into area 1 at ABR G is shown in FIG. 3E. Forwarding table 310 is labeled ("Sat." for "Satellite") and configured for forwarding in the direction into the satellite area; ABR G may also store a forwarding table (not shown) back into backbone area 0 for use with messages arriving from area 1 and headed for area 0. Like other bit indexed forwarding tables described herein, forwarding table 310 is generated using a bit indexed routing table (not shown) at ABR G. This routing table is similar to, for example, BIRT 302 in FIG. 3A, except that it includes routers within satellite area 1, area-1 bit positions for those routers that have them assigned, and neighbor nodes (namely routers M and N in area 1) via which the routers are reachable from ABR G. Forwarding table 310 includes neighbor node M with a neighbor bit array having set bits in area-1 bit positions "1" and "2". These bit positions correspond to egress nodes S and T of area 1, which are reachable via router M. Table 310 also includes neighbor node N with a neighbor bit array having set bits in area-1 bit positions "3" and "4", corresponding to egress nodes U and V. A similar bit indexed forwarding table, but for forwarding into area 2 from ABR H, is shown in FIG. 3F. Forwarding table 312 includes neighbor node Q with a neighbor bit array having set bits in area-2 bit positions "1", "2" and "3", since all three of these area-2 egress nodes are reachable from neighbor node Q.

The routing and forwarding tables of FIGS. 3A through 3E, along with any other tables described herein, are intended to illustrate certain kinds of data being provided without limiting the format or arrangement of such data. Tables as described herein may have data arranged in multiple different ways, and may take the form of a database or some other data structure. Multiple tables for a single node may in an alternative embodiment take the form of portions of a single table. In an embodiment, forwarding and routing tables for a node may be combined into a single database or other data structure. Single tables described herein may in alternate embodiments be split into more than one data structure. "Table" as used herein may refer to a relevant portion of a table or other data structure, or to a collection of multiple tables or data structures holding related data. Embodiments of the tables described herein may also include other data not expressly shown, such as interface information or other information that may appear in traditional routing or forwarding tables.

Figures 4, 6C, 6D, 6E:
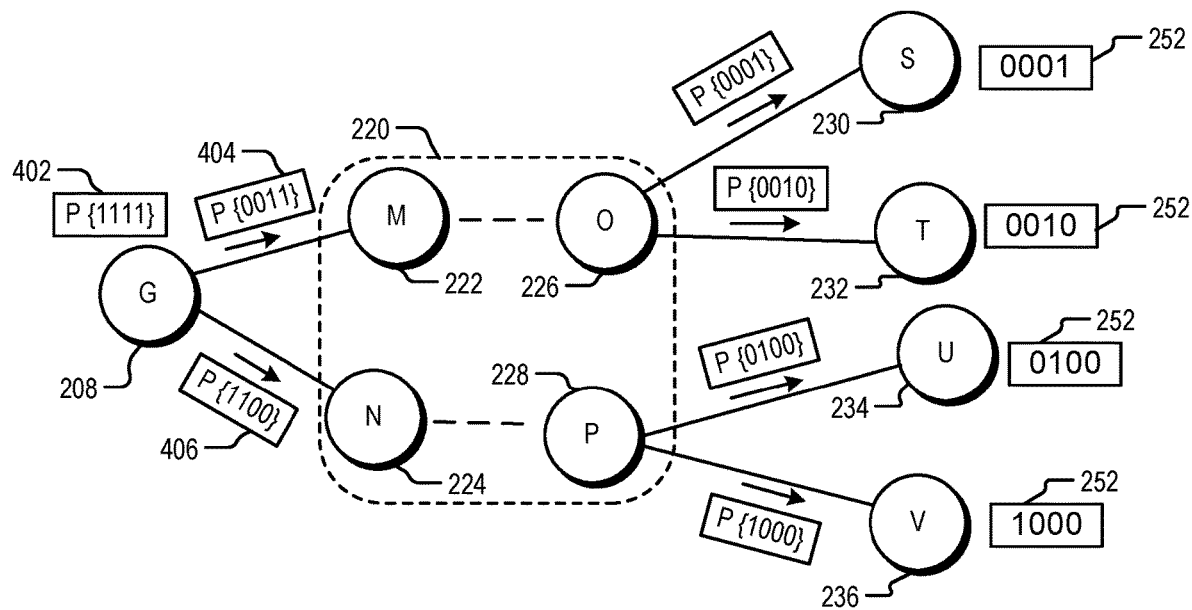
FIG. 4 is a diagram illustrating BIER forwarding through a portion of the network of FIG. 2.
FIG. 6C illustrates an example of a bit indexed routing table for a node in the network of FIG. 5.
FIGS. 6D and 6E illustrate examples of bit indexed forwarding tables for nodes in the network of FIG. 5.

An illustration of "broadcast" forwarding into area 1 of a message received at ABR G is provided in FIG. 4. In a similar manner as shown in FIG. 1B, icons representing message replicas are illustrated at successive times while moving through satellite area 1 of network 200. In the embodiment of FIG. 4, a packet 402 has been encapsulated at ABR G with a packet bit array having all bits set. Forwarding of packet 402 using BIFT 310 of ABR G results in packet replicas 404 and 406 being forwarded to routers M and N, respectively. In an alternate embodiment, as noted above, replicas 404 and 406 could be encapsulated directly with the neighbor bit arrays for neighbors M and N, respectively, in BIFT 310, without encapsulating packet 402 first. Replica 404 is forwarded through BIER-enabled core network 220 to node 226 (router O) and replica 406 is forwarded through core network 220 to node 228 (router P). Using their own BIER routing and forwarding tables (not shown), router O replicates the packet to egress nodes S and T, while router P replicates it to egress nodes U and V. In an embodiment, each of egress nodes S, T, U and V is coupled to a receiver. Each egress node removes the BIER encapsulation from the packets it receives and forwards the packets to its respective receiver. A receiver coupled to a BIER egress node may, in an embodiment, be a host computer operated by an end user.

In another embodiment, a receiver may be associated with a service provider, and the service provider may distribute received packets to end users over an additional network.

The multi-area network described in connection with FIGS. 2-4 above provides a combination of multicast and broadcast capability. At the ingress, and within backbone area 0, the network operates in a multicast fashion. In an embodiment with multiple satellite areas, any combination of the areas may be chosen to receive content delivered as messages to ingress node A. Upon arrival at a given ABR, the content is then broadcast to the corresponding satellite area. The area-0 bit positions assigned to ABRs G and H of FIG. 2 may be thought of as mapped to operations of broadcast throughout the corresponding satellite areas. The combination of multicast and broadcast capability realized using embodiments such as those described herein may be especially useful for applications such as video distribution or IP television (IPTV). Use of multiple areas allows the network to serve a large number of egress nodes, since each area is treated as a separate BIER network in terms of bit position assignment. The ABRs do not have to store and maintain multicast state in the manner typically required for multi-area BIER networks, however. In embodiments for which a very large number of egress nodes is needed within a single satellite area, a set identifier can also be used to allow multiple "sets" of bit positions to be addressed. In an embodiment, use of sets within a multi-area network allows a larger number of egress routers to be used with a smaller number of sets required as compared to a single-area network. In this way, less set-related replication is required.

Figure 5:
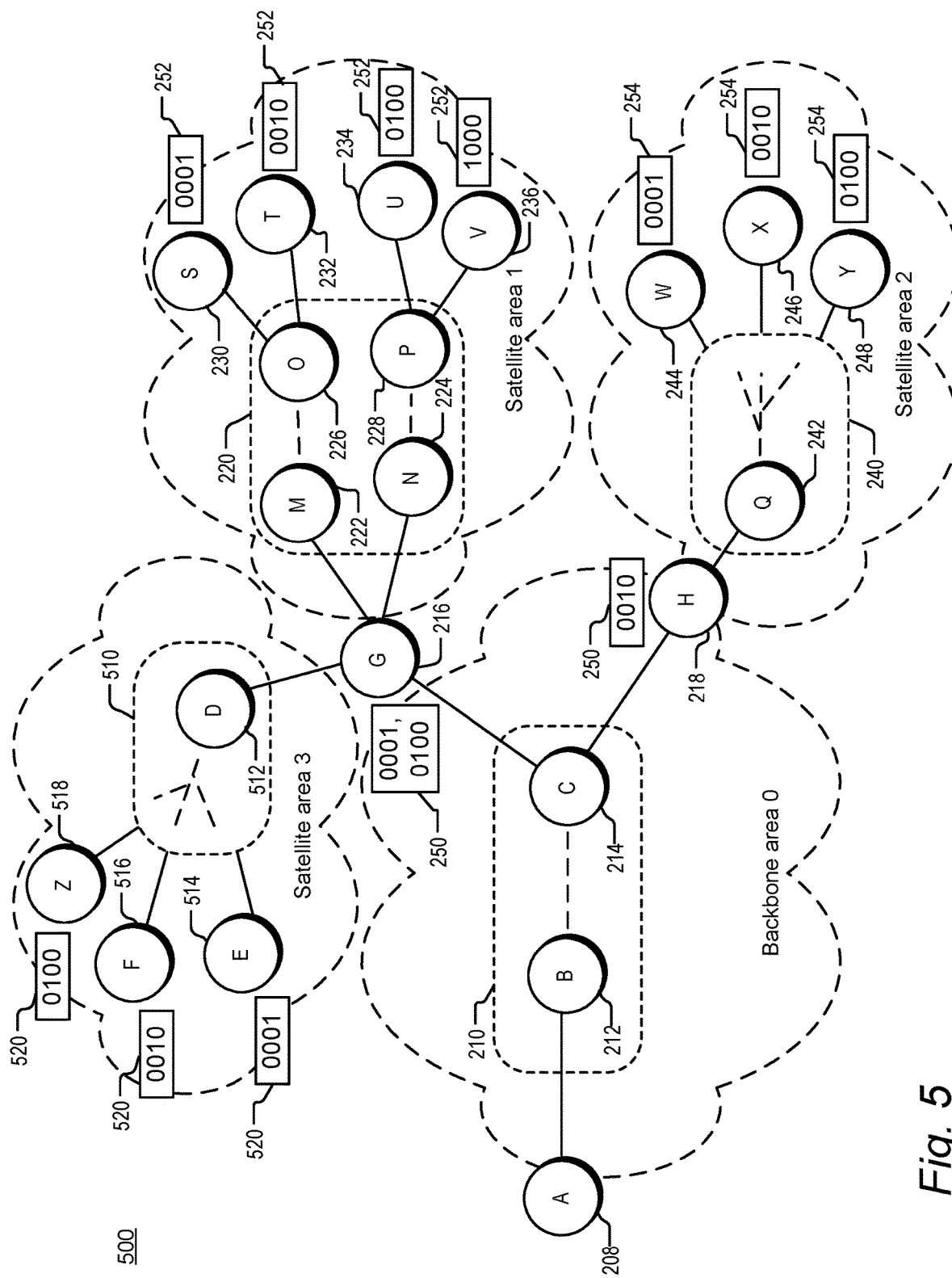
FIG. 5 is a simplified block diagram illustrating certain components of an embodiment of a multi-area network as described herein.

An alternative embodiment of a multi-area network is shown in FIG. 5. Network 500 of FIG. 5 is similar to network 200 of FIG. 2 except for the inclusion of an additional satellite area, satellite area 3. Like satellite area 2, satellite area 3 is connected to backbone area 0 via ABR G. In the embodiment of FIG. 5, ABR G is assigned two area-0 bit positions: BP "1" which corresponds to broadcasting into satellite area 1, and BP "3" which corresponds to broadcast into satellite area 3. In an embodiment, ABR G advertises each of these bit positions, along with information regarding the corresponding satellite areas, into backbone area 0.

Satellite area 3 contains BIER-enabled core network 510, which is similar in nature to core networks 210, 220 and 240 of areas 0, 1 and 2. Core network 510 includes node 512 (router "D"), which is a neighbor of ABR G. The dashed lines within core network 510 indicate that router D is connected, by a portion of the core network not explicitly shown, to area 3 egress routers 514 ("E"), 516 ("F") and 518 ("Z"). Egress routers E, F and Z are each assigned an area-3 bit position 520—specifically, area-3 bit positions "1", "2" and "3", respectively.

The inclusion of satellite area 3 in network 500 is reflected in the forwarding and routing tables of nodes in backbone area 0. An example of a bit indexed routing table portion for ingress router A of network 500 is shown in FIG. 6A. Except as expressly described, the routing and forwarding tables of FIGS. 6A through 6E for network 500 are similar to the tables for network 200 shown in FIGS. 3A through 3E, and the variations and considerations discussed above in connection with the tables for network 200 apply to the tables for network 500 as well. Routing table 602 of FIG. 6A is similar to table 302 of FIG. 3A, except for including the mapping of area-0 bit position "3" to satellite area 3 (via ABR G). This additional bit position is translated into bit indexed forwarding table 604, shown in FIG. 6B, as an additional set bit in the neighbor bit array for neighbor node B. Forwarding table 604 reflects that in network 500, destinations corresponding to three area-0 bit positions are reachable from ingress node A via neighbor node B. In the embodiment of FIG. 5, the three destinations are not three separate nodes or routers, but rather the three satellite areas accessible via, in this case, two area border routers. In additional embodiments, additional satellite areas can be accessed via ABR G or ABR H. In theory, the number of satellite areas forwarded to could be as high as the total number of available egress interfaces on the collection of area border routers connected to the backbone area, assuming only one ABR egress interface is needed to forward to all egress nodes within a satellite area. The maximum number of satellite areas would be smaller if multiple ABR egress interfaces are needed to reach all egress nodes within any of the satellite areas. In the embodiment of FIG. 5, for example, two egress interfaces of ABR G are needed to address all egress nodes of satellite area 1.

Continuing with examples of routing and forwarding tables for network 500, an example of a bit indexed routing table generated by router C of network 500 is shown in FIG. 6C. Routing table 606 of FIG. 6C is similar to table 306 of FIG. 3C, except for the additional mapping of BP "3" to satellite area 3 and neighbor ABR G. Bit indexed forwarding table 608 of FIG. 6D is generated from BIRT 606. Forwarding table 608 is similar to table 308 of FIG. 3D except that the neighbor bit array for neighbor G includes bit positions for both area 3 and area 1.

An example of a bit indexed forwarding table into the satellite areas connected to ABR G is shown in FIG. 6E. Forwarding table 610 is configured for forwarding into both of the satellite areas connected to ABR G. In an alternative embodiment, a separate forwarding table is generated at ABR G for forwarding into each satellite area. In an embodiment, the table (or portion of the table) to be used for forwarding a received message is determined by the area-0 bit position(s) having set bits in the incoming message (before removal by the ABR of the area-0 BIER encapsulation). In the embodiment of FIG. 6E, the bit position column ("BP") is for area-0 bit positions having set bits in the message arriving from backbone area 0. The neighbor bit array column includes arrays of bit positions assigned by the satellite area of the corresponding neighbor node, so that the neighbor bit arrays for neighbors M and N reflect area-1 bit positions and the neighbor bit array for neighbor D reflects area-3 bit positions.

In an alternative embodiment of forwarding table 610, the table includes either the area-0 bit position (BP column) or the satellite area corresponding to the bit position (Area column), but not both. An embodiment of a table mapping area-0 BPs to satellite areas is shown in FIG. 7A. This type of table is referred to as a "broadcast area table" herein. Broadcast area table 702 includes area-0 bit positions, corresponding satellite areas, and message bit arrays to be applied to a message after removal of the area-0 BIER encapsulation and before forwarding into the satellite area. In an alternative embodiment, the message bit array column is omitted from table 702. As long as the BIFT at the node includes satellite areas, finding the satellite area using the broadcast area table allows the forwarding table to be used to find the corresponding neighbor bit array(s). The neighbor bit arrays for neighbor nodes in the identified area can be used to encapsulate messages forwarded into the area, as described above in the discussion of ABR operation in network 200.

An alternate embodiment of a broadcast area table is shown in FIG. 7B. In table 704, area-0 bit positions are mapped to corresponding satellite areas and to the ABR's neighbor routers in the mapped area. In other embodiments, table 704 includes one or the other of the "Area" column or the "Neighbors" column, but not both. As noted above in the discussion of table 702 in FIG. 7A, mapping the bit position to the satellite area is sufficient if the ABR's forwarding table maps the satellite area to the corresponding neighbors and neighbor bit arrays. Alternatively, if the broadcast area table maps the bit positions to the neighbors used to forward into the respective areas represented by the bit positions, the neighbors can be used to get the neighbor bit arrays from the forwarding table. In some embodiments, information in the broadcast area tables described herein is instead included in the bit indexed forwarding and/or routing tables at the ABR.

Figure 8:
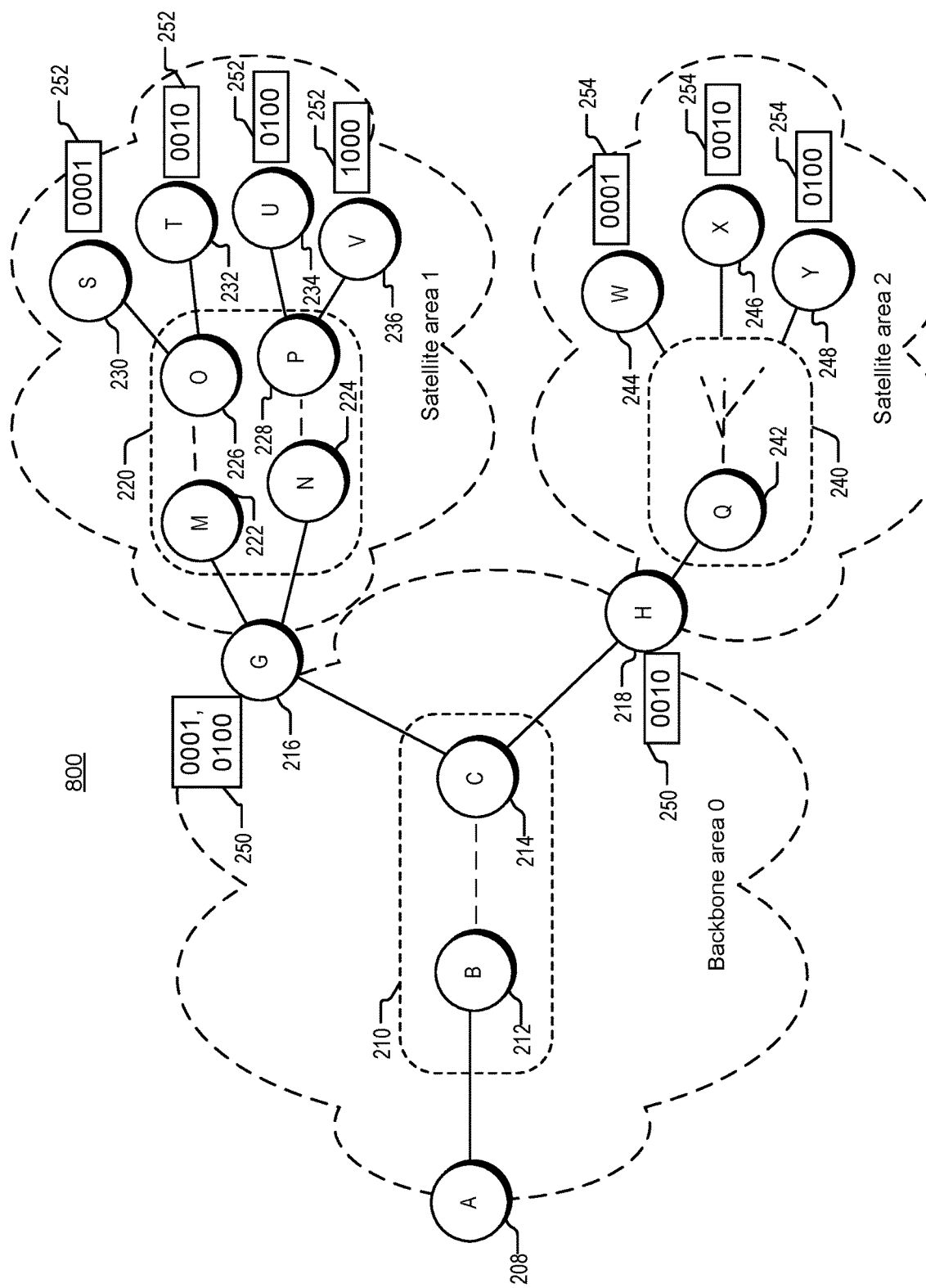
FIG. 8 is a simplified block diagram illustrating certain components of an embodiment of a multi-area network as described herein.

A third embodiment of a multi-area network is illustrated in FIG. 8. Network 800 of FIG. 8 is similar to network 200 of FIG. 2, except that ABR G in network 800 has two area-0 bit positions assigned rather than one. Each of the two bit positions assigned to ABR G is mapped to a subset of the egress routers in satellite area 1. In the embodiment of FIG. 8, bit position "1" is assigned to egress routers S and T, reachable from neighbor node M, and bit position "3" is assigned to egress routers U and V, reachable from neighbor node N. In other embodiments, nodes in a group within a satellite area assigned to a particular bit position do not have any particular relationship in terms of network topology. In general, an area-0 bit position in network 800 is mapped to a group of egress routers in a satellite area of the network. The group of egress routers can include all of the egress routers in the satellite area or a subset of the egress routers in the area.

In an embodiment, the assignment of bit positions to groups of satellite-area egress routers is communicated by a network controller. The bit position assignments may be made by an external authority in some embodiments. Area border routers such as ABR G of network 800 advertise any assigned area-0 bit positions throughout area 0, for use in generating BIER routing and forwarding tables at the BIER-enabled nodes in area 0. In an embodiment, the mapping of bit positions to respective groups of satellite area egress nodes is provided to ingress node A for use in generating the state information needed to determine a message bit array to apply to a message entering network 800 at ingress node A. In another embodiment, the mapping between the bit positions and groups of egress nodes is maintained at a network controller, and the controller supplies information to egress node A to use in applying message bit arrays. Advertisement of bit positions by ABRs G and H also includes, in some embodiments, advertisement of the mapping of the bit positions to groups of egress nodes. In a further embodiment, bit position information is advertised using an IGP having BIER extensions in the form of one or more type-length-value (TLV) data structures.

Bit indexed routing and forwarding tables within area 0 of network 800 are similar to corresponding tables for networks 200 and 500 described above, except that bit positions 1 and 3 are mapped, via ABR G, to respective subsets of satellite area 1. An embodiment of a broadcast area table at ABR G for mapping bit positions to message bit arrays for the subsets of area 1 routers is shown in FIG. 9A. Like table 702 of FIG. 7A, broadcast area table 902 of FIG. 9A includes area-0 bit positions, identification of corresponding satellite areas, and the corresponding satellite-area message bit arrays to be applied. In general, the mapping of area-0 bit position to satellite-area message bit array shown in table 902 needs to be stored at ABR G in an embodiment like that of FIG. 8 for which a bit position is mapped to fewer than all of the egress routers in a satellite area. In this type of network there is generally not a way to tell from the forwarding table alone what message bit array will need to be applied.

If subsets of egress routers within a satellite area are chosen such that a subset of egress routers includes all of the egress routers reachable via a particular neighbor node, then it is sufficient to map the area-0 bit positions to the corresponding satellite-area neighbor nodes. Because the subsets of area-1 egress routers are chosen in this way in the embodiment of FIG. 8, broadcast area table 904 of FIG. 9B could also be used at ABR G to determine the area-1 message bit array to be applied. Table 904 maps bit positions to neighbor nodes, which can then be used in the bit indexed forwarding table at G to find the corresponding neighbor bit array to be used to encapsulate the message.

The assignment of bit positions to subsets of routers within a satellite area, as illustrated by FIG. 8, may be useful in providing a "selective broadcast" scenario with additional granularity as compared to the embodiments of FIG. 2 and FIG. 5 involving broadcast to all egress routers within selected satellite areas. A certain amount of mapping information is needed at the ABR to store the mapping of area-0 bit positions to satellite-area bit arrays. In an embodiment, this mapping information is less burdensome to generate, store and/or maintain than conventional multicast-group-related state. This mapping may be referred to as "stateless" herein in that it lacks multicast-group-related state.

As shown in FIG. 8, subset-based bit position assignment such as that at ABR G can be combined with full-area-based bit position assignment as employed at ABR H. Moreover, these assignment scenarios may be combined with the multiple-area bit position mapping shown in FIG. 5. As an example, an ABR could in one embodiment of a multi-area network be assigned a first bit position mapped to all of the egress routers in a first satellite area, a second bit position mapped to a subset of the egress routers in a second satellite area, and a third bit position mapped to a different subset of the egress routers in the second satellite area.

Each of the multi-area networks described herein includes a backbone area and one or more satellite areas adjacent to the backbone area. In additional embodiments, multi-area networks contemplated herein can include one or more additional satellite areas connected to the satellite areas adjacent to the backbone area. In other words, a first satellite area can "fan out" into additional satellite areas, and these additional areas can fan out into still more areas. In such an embodiment, for example, one or more of egress nodes S, T, U and V in satellite area 1 or W, X and Y in satellite area 2 of the multi-area networks described herein could be an area border router connecting satellite area 1 to an additional satellite area. Like area border routers G and H of backbone area 0, an ABR connecting one satellite area and a further satellite area is assigned one or more area-based bit positions mapped to a respective one or more groups of egress routers in the further satellite area. Use of successive "layers" of satellite areas linked by area border routers assigned area-based bit positions can allow the number of egress routers that can be reached from the area-0 ingress node to be multiplied even more.

Figure 10:
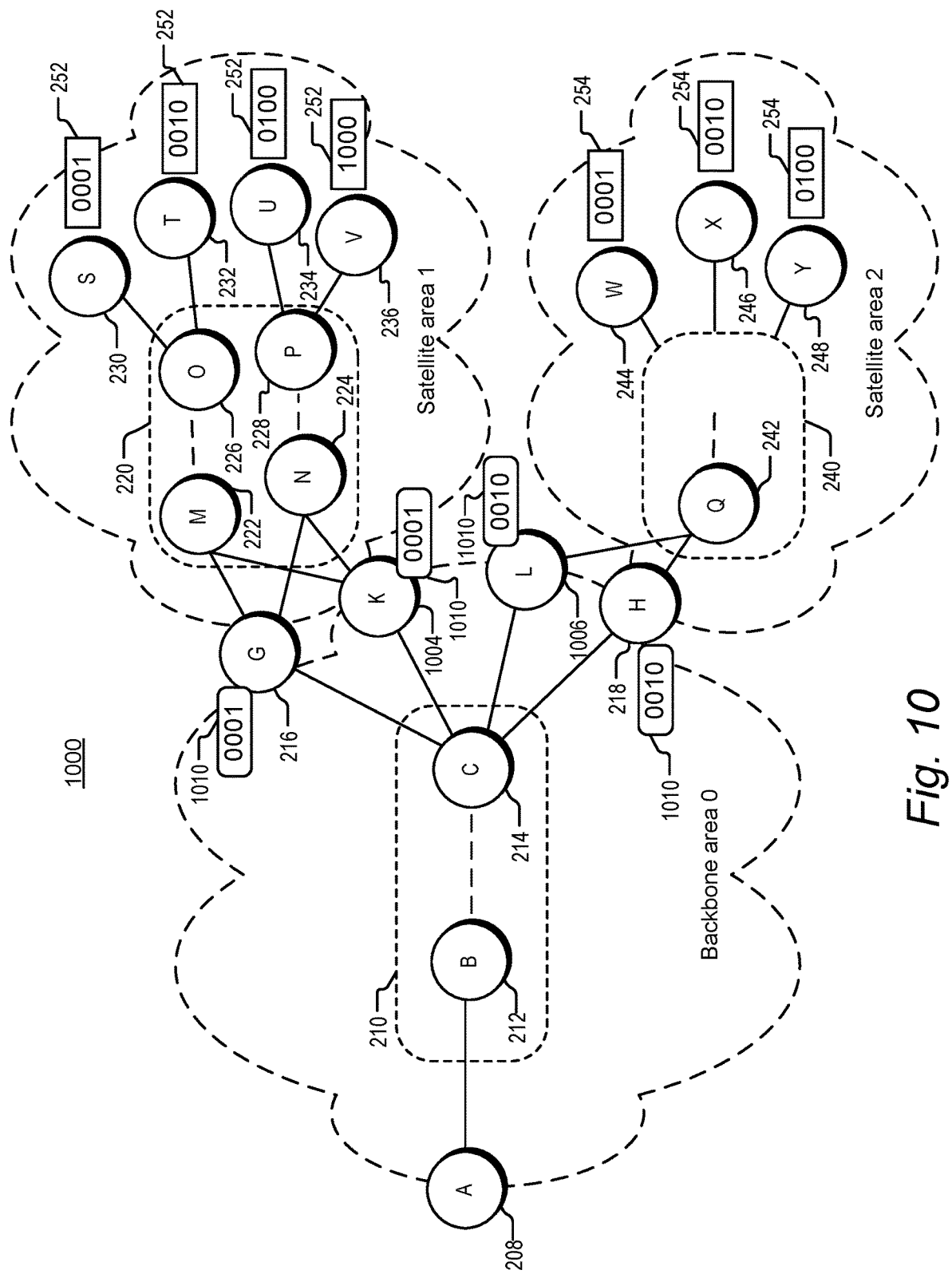
FIG. 10 is a simplified block diagram illustrating certain components of an embodiment of a multi-area network as described herein.

FIG. 10 illustrates a fourth embodiment of a multi-area network. Network 1000 of FIG. 10 is similar to network 200 of FIG. 2, but has a different configuration of area border routers. Backbone area 0 is connected to satellite area 1 both by ABR G and by node 1004 (ABR K). Similarly, area 0 is connected to satellite area 2 by both ABR H and by node 1006 (ABR L). Each of the ABRs is assigned an area-0 "anycast" bit position 1010. The anycast bit positions behave differently than other bit positions in network 1000, as denoted in FIG. 10 by the different shape (rounded corners) of the boxes surrounding the anycast bit positions. In particular, an anycast bit position as used herein can be assigned to more than one node reachable by the same BIER-enabled node. The anycast bit positions are advertised as such, so that BIER-enabled nodes can incorporate this characteristic into their bit indexed routing and forwarding tables. In an embodiment, assignment of a standard BIER bit position to more than one router is seen as a conflict, and treated as an error or invalid assignment. In such an embodiment, it is important that anycast bit positions be identified in the network and recognized as an exception to the treatment of conflicting bit positions. In an embodiment, the anycast nature of a BIER bit position is advertised along with other BIER-related information using a BIER extension of an IGP. In the case of an anycast bit position, a BIER-enabled forwarding node forwards a message toward only one of multiple nodes sharing an anycast bit position. Node C of network 1000, for example, chooses one of nodes G and K when forwarding a message having a set bit in BP 1 of its message bit array, and one of nodes H and L when forwarding a message having a set bit in BP 2.

An example of a bit indexed routing table for ingress node A of network 1000 is shown in FIG. 11A. Except as expressly described, the routing and forwarding tables of FIGS. 11A through 11C for network 1000 are similar to those for network 200 in FIGS. 3A, 3C and 3D, and the variations and considerations discussed above in connection with the tables for network 200 apply to the tables for network 1000 as well. Routing table 1102 of FIG. 11A is similar in some ways to table 302 of FIG. 3A, but table 1102 includes an indicator that bit positions 1 and 2 are anycast bit positions, and describes satellite areas 1 and 2 as being reachable via routers G or K and H or L, respectively. As noted above for table 302, inclusion of satellite areas in the router column is for purposes of explanation, and this information may be reflected differently in an actual routing table. For example, routers G, K, H and L may have separate entries in other embodiments, with the represented satellite areas indicated in an additional column.

An example of a bit indexed routing table for core node C of network 100 is shown in FIG. 11B. Routing table 1104 of FIG. 11B is similar to table 1102 of FIG. 11A, except for including ABRs G, K, H and L as neighbors instead of router B. An example of a bit indexed forwarding table generated from routing table 1104 is shown in FIG. 11C. Because bit positions 1 and 2 are anycast bit positions, router C will use just one of the routers corresponding to each bit position when forwarding a message carrying a set bit in that bit position. In an embodiment, the router is chosen according to a load-balancing procedure. In an alternative embodiment, the router included in the first forwarding table entry for a given bit position is used, with any additional entries for that bit position used for backup, or redundancy, in the event of a network disruption or failure taking the first-entry router out of service. Use of a redundant router sharing an anycast bit position as a backup router in the event of a network disruption can be combined with any of various schemes of selecting which anycast router to use.

As shown in FIG. 10, alternate ABRs G and K are each connected to neighbors M and N of satellite area 1. Similarly, routers H and L are each connected to neighbor Q of satellite area 2. The alternate routers sharing an anycast bit position are configured to forward messages in the same manner, each including a forwarding table similar to that of FIG. 3E (for ABRs G and K) or FIG. 3F (for ABRs H and L). Use of alternate routers sharing anycast bit positions can be combined with any of the bit position mappings described herein, whether a bit position is mapped to all egress routers in a satellite area or a subset of the egress routers, and whether an ABR connects to one satellite area or multiple satellite areas.

Figure 12:
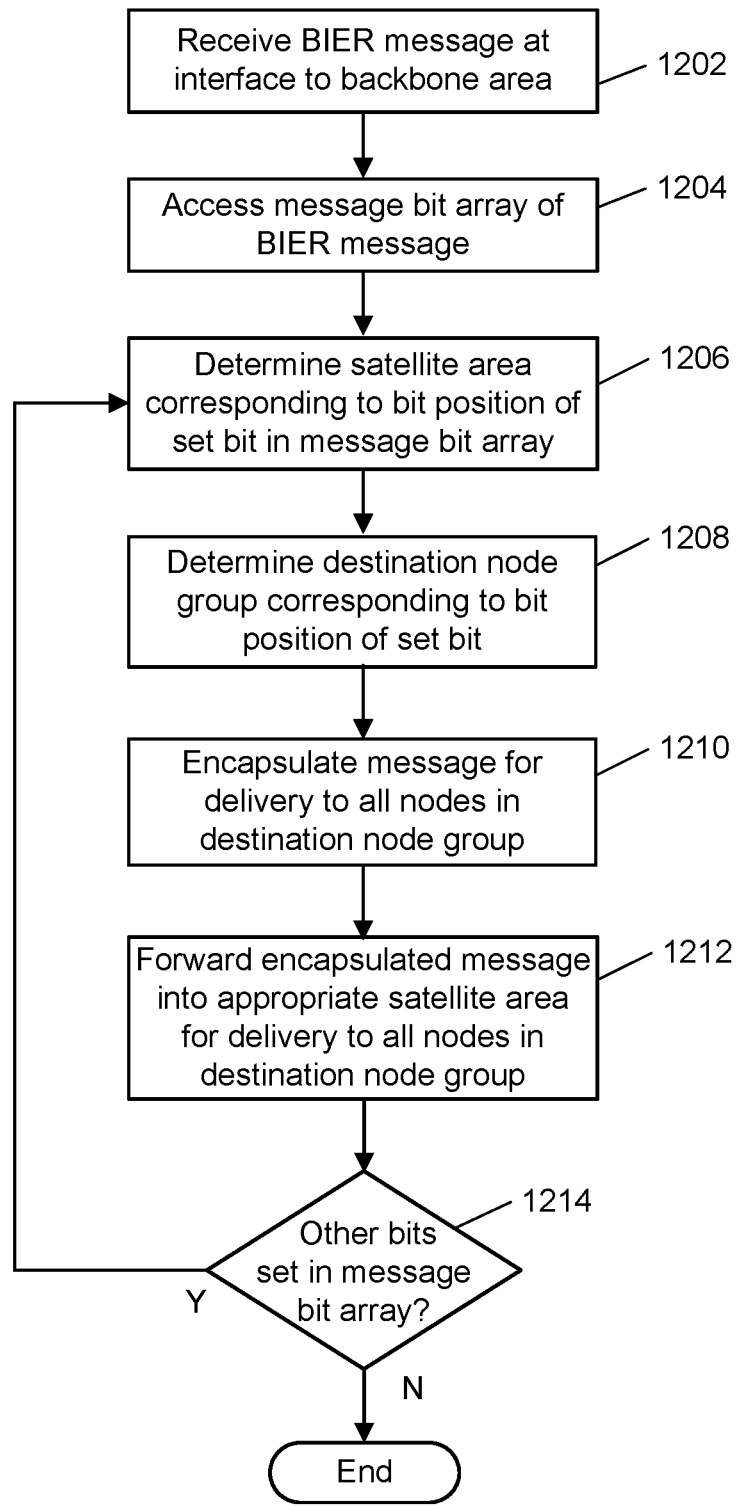
FIG. 12 is a flow chart illustrating an example of a method performed at a node of a network described herein.

An embodiment of a method carried out by an area border router in a network like one of the networks described herein is illustrated by the flowchart of FIG. 12. In the embodiment of FIG. 12, method 1200 is performed by an ABR connecting a backbone area of a network with one or more satellite areas of the network. The method begins at step 1202 with receiving a BIER-encapsulated message at an interface to the backbone area of the network. The BIER encapsulation of the received message reflects the bit positions assigned for the backbone area of the network. The message bit array of the received message is accessed (step 1204), and a satellite area corresponding to the bit position of a set bit in the message bit array is determined (step 1206). In an embodiment, determining the corresponding satellite area involves accessing a table such as the broadcast area table embodiments of FIGS. 7A, 7B, 9A and 9B. In an alternative embodiment, particularly when the ABR connects to a single satellite area, the satellite area may be explicitly or implicitly embedded in the configuration of the forwarding engine at the ABR. In an embodiment, the ABR connects to only one satellite area and the bit position of a set bit in the message bit array is checked against the bit position assigned to the ABR, to ensure that the received message has been properly sent to the ABR.

Method 1200 continues in step 1208 with determining the destination node group corresponding to the bit position of the set bit in the message bit array. In one embodiment, the destination node group includes all egress routers within the satellite area determined in step 1206. Such an embodiment corresponds to the bit position mapping in network 200 of FIG. 2, for example. In another embodiment, the destination node group includes a subset of the egress routers within the satellite area. An example of this embodiment is the mapping of bit positions to ABR G in network 800 of FIG. 8. The determination of the destination node group is done, in some embodiments, by referencing a table such as the broadcast area tables of FIGS. 7A, 7B, 9A and 9B. The destination node group in such an embodiment may be represented by a message bit array in some embodiments, such as the message bit arrays of tables 702 and 902 in FIGS. 7A and 9A, respectively. In embodiments for which the destination node group includes all egress routers reachable from one or more neighbor nodes, the destination node group may also be represented by identifiers of one or more neighbor nodes, as in tables 704 and 904 of FIGS. 7B and 9B, respectively. In an alternative embodiment, particularly when the ABR connects to a single satellite area and the destination node group includes all egress routers within the area, the destination node group may be explicitly or implicitly embedded in the configuration of the forwarding engine at the ABR. The forwarding engine operation may reflect a rule, for example, to forward received messages to all egress nodes of the connected satellite area.

In step 1210 of method 1200, the method continues with encapsulating the received message for delivery to all of the nodes in the destination node group. Encapsulating the received message includes encapsulating a copy, or replica, of the received message. The encapsulated message is then forwarded into the identified satellite area in step 1212. Encapsulating the message includes removing, from a copy of the message to be forwarded, the BIER encapsulation reflecting the backbone-area bit positions and attaching BIER encapsulation reflecting bit positions of the satellite area determined in step 1206. As discussed further above, the message is in some embodiments encapsulated with a new message bit array reflecting all of the nodes in the destination node group. This encapsulated message is then forwarded using the ABR's bit indexed forwarding table for forwarding into the satellite area. In an embodiment for which all egress nodes in a satellite area are in the destination node group, the message bit array may be as simple as a bit array having all bits set, or a message bit array formed by combining the neighbor bit arrays in the bit indexed forwarding table using a logical OR operation.

In an embodiment for which the destination node group includes a subset of the egress nodes in the satellite area, the message bit array for use in encapsulation step 1210 may be found in a broadcast area table as described further above. In embodiments for which the destination node group includes all egress routers reachable from one or more neighbor nodes, a message can be encapsulated and forwarded on a neighbor-by-neighbor basis using the bit indexed forwarding table. In such an embodiment, a copy of the message can be encapsulated with the neighbor bit array found in the BIFT for a neighbor node having all of its reachable destination nodes within the group of destination nodes, and the message copy then forwarded to that neighbor node. In embodiments for which a forwarding table includes alternate neighbor nodes sharing an anycast bit position as described herein, the forwarding node would need to first decide which of the alternate neighbor nodes to use, and to forward the message copy to only one of the neighbor nodes sharing an anycast bit position.

If one or more additional bits are set in the message bit array of the message received from the backbone area, steps 1206 through 1212 of method 1200 are repeated for the bit positions of the additional set bits. Multiple bits in the message bit array of the incoming message may be set in embodiments for which an ABR has multiple assigned bit positions. This scenario is illustrated, for example, by ABR G in network 500 of FIG. 5 and network 800 of FIG. 8.

As noted above, in the embodiment of FIG. 12 method 1200 is performed by an ABR connecting a backbone area and satellite area of a network, where each area has a separate BIER bit position assignment scheme. In some embodiments contemplated herein, however, mapping of one bit position assigned to a router to an operation of forwarding to multiple other destinations can be implemented within a single BIER area or domain. An example of this mapping can be illustrated with reference to FIG. 1B. As shown in FIG. 1B and discussed further above, egress nodes D, F and E of single-BIER-domain network 100 are assigned bit positions of "1", "2" and "3", respectively. Consider now an embodiment in which node E is assigned bit position "4" as well as bit position 3. In this embodiment, bit position 4 is mapped to the operation, at node E, of encapsulating an incoming message with message bit array 0011. This mapping would be reflected in a forwarding table at node E, and bit position 4 would have been advertised to the BIER-enabled nodes in the network as corresponding to this operation by node E. The 0011 message bit array applied to a message by node E is then used to forward the message from node E to egress nodes F and D, according to the bit positions of the set bits.

In the embodiment just described, there are two message bit arrays that can be applied by BIER ingress node A to send a message to egress nodes E, F and D. One is 0111, which includes the standard BIER bit positions for each of the three egress nodes. The other is 1100, which includes the standard BIER bit position "3" for node E (which will cause a message to be de-encapsulated and passed toward receiver R3) and the operation-mapped BIER bit position "4" for node E (which will cause re-encapsulation and forwarding to nodes F and D, as described above). Use of message bit array 1100 may be advantageous in cases when it is desirable that a message reach node E before reaching F and D. This BIER encapsulation option could also be useful in cases when it is desirable for a message's path to nodes D and F to pass through node E. As this example shows, the operation-mapped BIER bit positions contemplated herein may be used in single-BIER-domain networks as well as in multi-area BIER networks.

Figure 13:
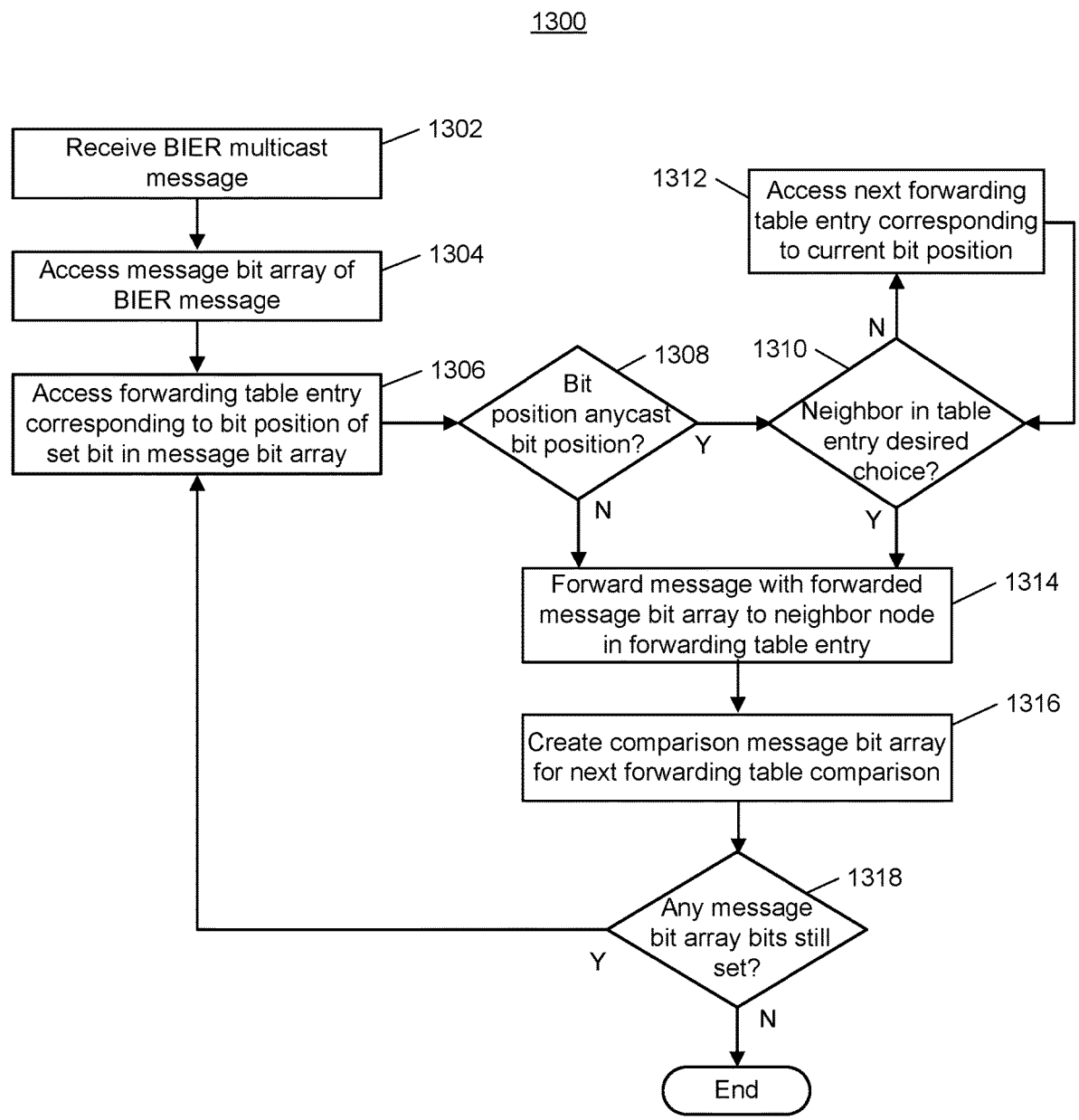
FIG. 13 is a flow chart illustrating an example of a method performed at a node of a network described herein.

The flowchart of FIG. 13 illustrates an embodiment of a BIER forwarding method that may be carried out by a BIER-enabled forwarding node in networks such as those described herein. For example, method 1300 of FIG. 13 may be carried out by a node within the BIER-enabled core networks of the network areas described herein. Method 1300 may also be carried out by the forwarding engine portion of an ingress node to a BIER network, where method 1300 would reflect an embodiment of forwarding done at the ingress node after BIER encapsulation has been applied. With regard to BIER forwarding performed by area border routers like those described herein, method 1300 is most applicable to embodiments in which a message is encapsulated by the ABR with a message bit array reflecting all destination nodes within the destination node group, prior to beginning a forwarding process.

Method 1300 begins with receiving a BIER multicast message (step 1302) and accessing the message bit array of the BIER message (step 1304). The method continues with accessing an entry in the node's bit indexed forwarding table corresponding to the bit position of a set bit in the message bit array (step 1306). In some embodiments, accessing the forwarding table entry involves a comparison of the message bit array with a neighbor bit array in the forwarding table. If there is a bit position for which the message bit array and neighbor bit array both have a set bit, the forwarding table entry including the neighbor bit array corresponds to the bit position of a set bit in the message bit array. One way to determine that there is a bit position for which the message bit array and neighbor bit array both have a set bit is to perform a bitwise logical AND of the message bit array with the neighbor bit array and obtain a nonzero result. In an embodiment, the message bit array is compared to each neighbor bit array in the forwarding table in turn, until an entry corresponding to a bit position of a set bit in the message bit array is found.

In some embodiments, the bit indexed forwarding table at the BIER forwarding node performing method 1300 includes a bit position column and is sorted by bit position. In such an embodiment, the forwarding table entry access of step 1306 can include determining the bit position of a set bit in the message bit array, then checking for a forwarding table entry corresponding to that bit position. Bit positions of set bits in the message bit array can be checked in turn, until a bit position having a corresponding entry in the BIFT is found.

If the bit position corresponding to the accessed forwarding table entry is an anycast bit position ("yes" branch of decision step 1308), the method continues by determining whether the neighbor node in the accessed forwarding table entry is the desired choice for forwarding of the message (decision step 1310). In general, presence of one forwarding table entry corresponding to an anycast bit position suggests the presence of at least one additional forwarding table entry corresponding to the same anycast bit position, with the different entries corresponding to respective alternate neighbor nodes. If there are forwarding table entries reflecting alternate neighbor nodes corresponding to the same anycast bit position, the BIER forwarding node chooses the desired neighbor node for forwarding of the message.

In an embodiment, the desired neighbor is chosen through a load balancing procedure. As an example, a load balancing procedure could involve keeping track of how many messages are sent to each alternate node and attempting to distribute traffic relatively evenly among the alternate nodes. In another example, a load balancing procedure could involve checking an entropy field in the message encapsulation, where the entropy field relates to a particular message flow that the message belongs to. The load balancing procedure may attempt to forward messages having the same entropy value to the same neighbor node. In some embodiments, a combination of the above load balancing practices is used. Alternatively or in addition to the above approaches, other load balancing approaches may be employed, where such approaches will be known to one of ordinary skill in the art of network routing in view of this disclosure.

In other embodiments, the desired neighbor node may be chosen by a simple rule such as use of the uppermost forwarding table entry of those corresponding to the same anycast bit position. In still a further embodiment, the desired neighbor node may be chosen by default because alternate neighbor nodes are unavailable due to a network failure or disruption, or because entries containing alternate nodes have been rendered inactive through a forwarding table configuration or updating process. If the neighbor node in the accessed forwarding table entry is not the desired node ("no" branch of step 1310), other forwarding table entries corresponding to the same anycast bit position are accessed until the desired neighbor node is found (step 1312, "yes" branch of step 1310).

When the desired neighbor node corresponding to an anycast bit position is identified ("yes" branch of step 1310), or if the bit position corresponding to the accessed forwarding table entry is not an anycast bit position ("no" branch of step 1308), a copy of the message is forwarded, with a "forwarded message bit array" attached, to the neighbor node in the currently-accessed forwarding table entry (step 1314). A forwarded message bit array as used herein is the message bit array carried by a message copy forwarded by a BIER node. In an embodiment, the message bit array of the incoming message is altered to form the forwarded message bit array. In a further embodiment, the forwarded message bit array is generated from the incoming message bit array by resetting any set bits in the message bit array in bit positions corresponding to egress routers not reachable via the neighbor node that the message is being forwarded to. In other words, for any destination nodes that were indicated in the incoming message bit array as intended destinations but are not reachable via the neighbor node, the forwarded message bit array is altered to indicate that those destinations are not intended destinations. In a further embodiment, the forwarded message bit array is generated by performing a bitwise logical AND between the incoming message bit array and the neighbor bit array, with the result becoming the forwarded message bit array.

Method 1300 continues with alteration of the instance of the incoming message bit array used for further comparisons with the bit indexed forwarding table. In step 1316, a "comparison message bit array" is created for use in any additional forwarding table comparisons. To create the comparison message bit array, set bits in the current message bit array in bit positions corresponding to those reachable by the just-forwarded message are cleared in the comparison message bit array. In one embodiment, this bit clearing is implemented by performing a bitwise AND operation between the incoming message bit array and the inverse of the neighbor bit array corresponding to the neighbor node to which a packet was just sent. The comparison message bit array is then used for identifying additional forwarding table entries corresponding to bit positions of any remaining set bits in the comparison message bit array (in further iterations of step 1306). If any bits in the comparison message bit array are still set ("yes" branch of decision step 1318), the method continues with accessing of a corresponding forwarding table entry in step 1306. The message bit array alterations of steps 1314 and 1316 are optionally employed to prevent looping and duplication of messages. These steps may be particularly useful in embodiments employing anycast bit positions. One or both of these alterations may be omitted in embodiments for which duplication and looping are not present or are otherwise not of concern. Various modifications and variations of the methods and flowcharts described herein will be apparent to one of ordinary skill in the art in view of this disclosure. For example, certain steps of the methods described herein may be performed in a different order without substantially affecting the outcome of the method.

Figure 14:
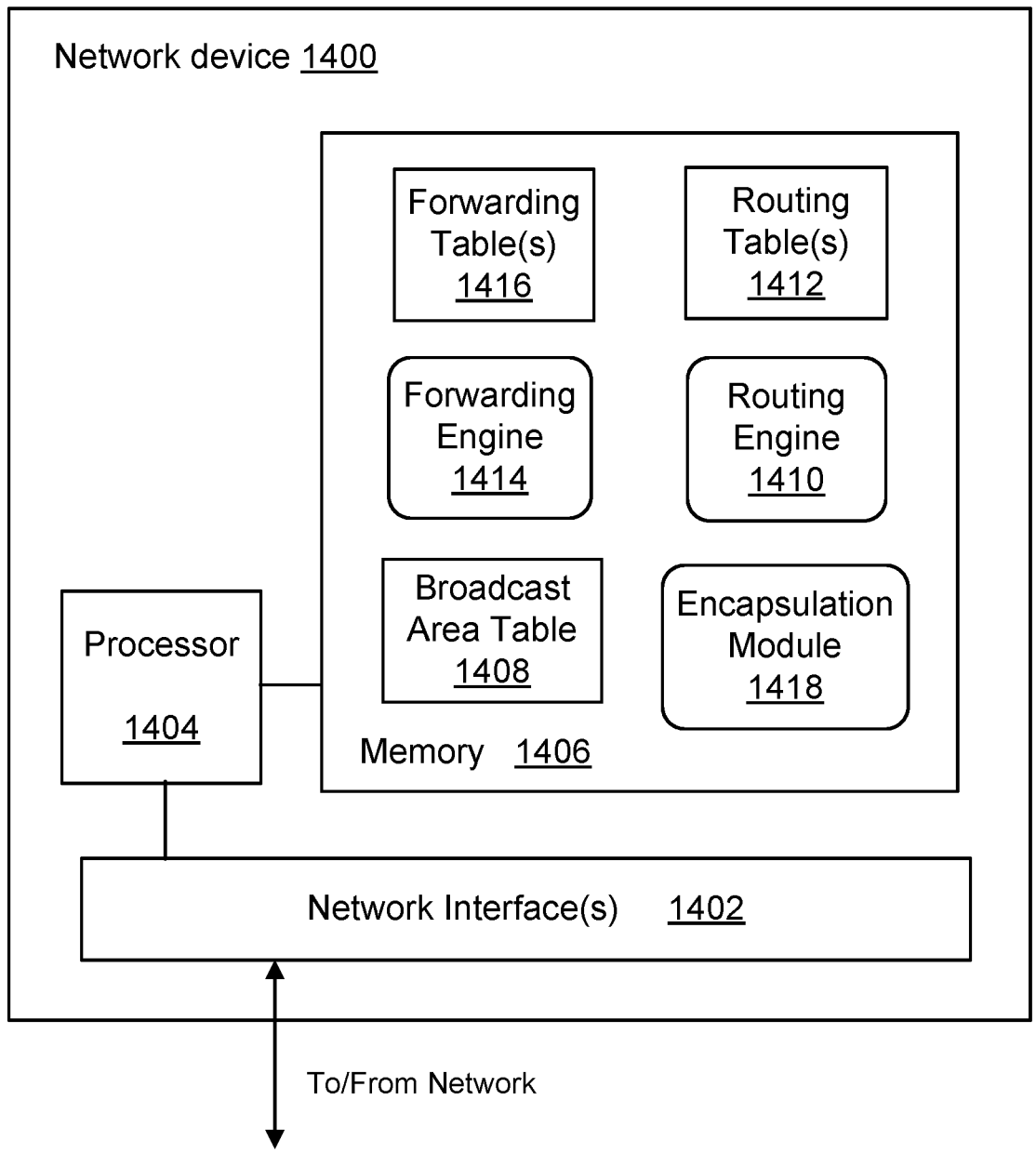
FIG. 14 is a simplified block diagram illustrating certain components of an example network device that may be employed in the networks described herein.

FIG. 14 is a simplified block diagram of an exemplary network device that may be associated with a node in one of the networks described herein. In particular, network device 1400 of FIG. 14 may be associated with an area border router as described herein. In the embodiment of FIG. 14, network device 1400 includes one or more network interfaces 1402, a processor 1404 and memory 1406, where memory 1406 stores one or more routing tables 1412, one or more forwarding tables 1416, and broadcast area table 1408. Routing tables 1412 include one or more bit indexed routing tables, example embodiments of which are described above in connection with FIGS. 3A, 3C, 6A, 6C, 11A and 11B. Forwarding tables 1416 include one or more bit indexed forwarding tables, example embodiments of which are described above in connection with FIGS. 3B, 3D, 3E, 3F, 6B, 6D, 6E and 11C. Example embodiments of broadcast area table 1408 are described above in connection with FIGS. 7A, 7B, 9A and 9B. Memory 1406 further stores program instructions executable by processor 1304 for implementing a routing engine 1410 and forwarding engine 1414.

Network interface 1402 is configured for both sending and receiving both messages and control information, such as IGP advertisements, within a network. In an embodiment, network interface 1402 comprises multiple interfaces and can accommodate multiple communications protocols and control protocols. In an embodiment involving a network controller, network interface 1402 is further configured for communication between the network device and a network controller. In an embodiment for which network device 1400 is associated with an area border router, network interface 1402 includes at least a first interface connecting network device 1400 with a counterpart device at a node in a first area of a network, such as a backbone area of the network. In such an embodiment, network interface 1402 also includes a second interface connecting network device 1400 with a counterpart device at a node in a second area of the network, such as a satellite area of the network.

Memory 1406 includes a plurality of storage locations addressable by processor 1404 for storing software programs and data structures associated with the methods described herein. As such, memory 1406 may be implemented using any combination of built-in volatile or non-volatile memory, including random-access memory (RAM) and read-only memory (ROM) and integrated or peripheral storage devices such as magnetic disks, optical disks, solid state drives or flash drives. In the embodiment of FIG. 14, memory 1406 stores routing engine 1410. Routing engine 1410 includes computer executable instructions that when executed by processor 1404 are operable to perform operations such as receiving network topology information via communications such as IGP advertisements or network controller communications, generating a bit indexed routing table 1412 reflecting network topology, router identifiers, and bit positions, and generating a bit indexed forwarding table 1416 from the routing table. In an embodiment, routing engine 1410 incorporates into routing table 1412 and/or forwarding table 1416 received information mapping a bit position of an area border router to a satellite area connected to the router. Alternatively or in addition, routing engine 1410 in some embodiments incorporates into routing table 1412 and/or forwarding table 1416 received information regarding the "anycast" nature of an assigned bit position.

Memory 1406 also stores forwarding engine 1414. Forwarding engine 1414 includes computer executable instructions that when executed by processor 1404 are operable to perform BIER forwarding operations such as those described in connection with FIG. 13 above. For example, instructions associated with forwarding engine 1414 are executable in some embodiments to perform operations such as accessing a message bit array of a received BIER message, accessing an entry in a forwarding table 1416 corresponding to the bit position of a set bit in the message bit array, and forwarding a message copy with a forwarded message bit array to the neighbor node in the accessed forwarding table entry. In a further embodiment, instructions associated with forwarding engine 1414 are executable to determine whether a bit position corresponding to a forwarding table entry is an anycast bit position, and if so, to determine whether the neighbor node in the accessed forwarding table entry is the desired choice for forwarding of the received BIER message.

In the embodiment of FIG. 14, memory 1406 also stores encapsulation module 1418. Encapsulation module 1418 includes instructions that when executed by processor 1404 are operable to perform operations similar to some of those described in connection with FIG. 12 above. For example, instructions associated with encapsulation module 1418 are executable in some embodiments to determine a satellite area corresponding to a bit position of a set bit in the message bit array of a received BIER message, determine a destination node group corresponding to the bit position of the set bit, and encapsulate the received message for delivery to all nodes in the destination node group.

As noted above, network device 1400 may be associated with an area border node in some embodiments. Other network device embodiments may be associated with other types of BIER nodes. For example, a network device for a BIER ingress node such as router A in the networks described herein is similar in configuration to network device 14, except that instead of broadcast area table 1408 an ingress node device includes a different table having information for mapping non-BIER messages to appropriate message bit arrays. In an embodiment, this table is a multicast group membership table similar to table 124 of FIG. 1B. In addition, the encapsulation module for an ingress node device is configured to apply the message bit array found in such an ingress node state table, rather than encapsulating a message for delivery to all destination nodes within a destination node group. As another example, a network device for a core BIER node such as router C or router P in the networks described herein is also similar in configuration to network device 14, except that a network device for a core BIER node does not need to include an encapsulation module or broadcast area table.

In addition to those described above, various modifications and variations of network device 1400 will be apparent to one of ordinary skill in the art in view of this disclosure. For example, the functions of processor 1404 may be implemented using a combination of multiple processors. Moreover, embodiments of a network device contemplated herein may include additional components not shown in the embodiment of FIG. 14. For example, network devices associated with nodes at the edge of a BIER domain may be adapted to use approaches and protocols not involving BIER in addition to using BIER. Such a network device may be adapted to use, for example, IP routing or MPLS with LDP in addition to BIER. In some embodiments, network devices associated with core nodes of a BIER domain may be adapted to use approaches and protocols not involving BIER in addition to using BIER. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 15:
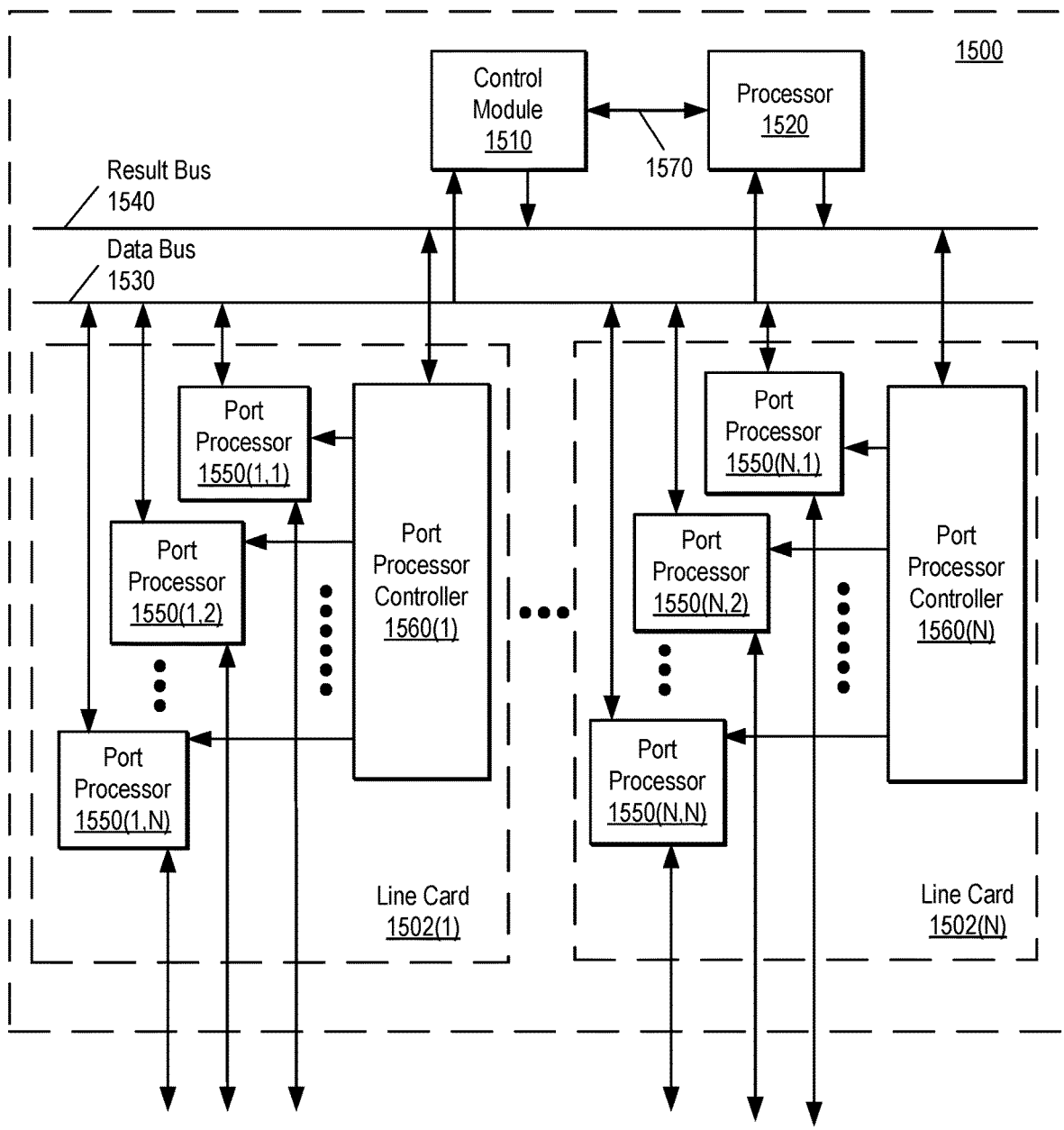
FIG. 15 is a simplified block diagram illustrating certain components of an example network device that may be employed in the networks described herein.

FIG. 15 is a block diagram providing an additional illustration of a network device that may act as, or be associated with, a node in one of the networks described herein. FIG. 15 depicts (at least in part) one configuration of a network device or a network routing element (e.g., a hub, router, switch, or similar device) 1500. In this depiction, network device 1500 includes a number of line cards (line cards 1502(1)-1502(N)) that are communicatively coupled to a control module 1510 and route processor 1520 via a data bus 1530 and result bus 1540. In an embodiment, line cards 1502(1)-1502(N), along with data bus 1530 and result bus 1540, form at least a portion of a network interface such as network interface(s) 1402 of FIG. 14. Control module 1510 may in an embodiment include engines, modules and data structures such as forwarding engine 1414, routing engine 1410, encapsulation module 1418, broadcast area table 1408, forwarding table(s) 1416 and routing table(s) 1412 of FIG. 14. Line cards 1502(1)-(N) include a number of port processors 1550(1, 1)-(N, N) which are controlled by port processor controllers 1560(1)-(N). Control module 1510 and processor 1520 are not only coupled to one another via data bus 1530 and result bus 1540, but are also communicatively coupled to one another by a communications link 1570. It is noted that in alternative embodiments, each line card can include its own forwarding engine.

When a message (e.g., a packet) is received at network device 1500, the message may be identified and analyzed in the following manner. Upon receipt, a message (or some or all of its control information) is sent from the one of port processors 1550(1, 1)-(N, N) at which the message was received to one or more of those devices coupled to data bus 1530 (e.g., others of port processors 1550(1, 1)-(N, N), control module 1510 and/or route processor 1520). Handling of the message can be determined, for example, by control module 1510. For example, a forwarding engine within control module 1510 may determine that the message should be forwarded to one or more of port processors 1550(1, 1)-(N, N). This can be accomplished by indicating to corresponding one(s) of port processor controllers 1560(1)-(N) that the copy of the message held in the given one(s) of port processors 1550(1,1)-(N,N) should be forwarded to the appropriate one of port processors 1550(1,1)-(N,N). Network devices described herein, such as network devices 1400 and 1500, include one or more processors such as processor 1404 and route processor 1520, which may take the form of, for example, microprocessors, PLDs (Programmable Logic Devices), or ASICs (Application Specific Integrated Circuits). These processors are configured to execute program instructions stored in computer readable storage media of various types, including RAM (Random Access Memory), ROM (Read Only Memory), Flash memory, MEMS (Micro Electro-Mechanical Systems) memory, and the like.

Figure 16:
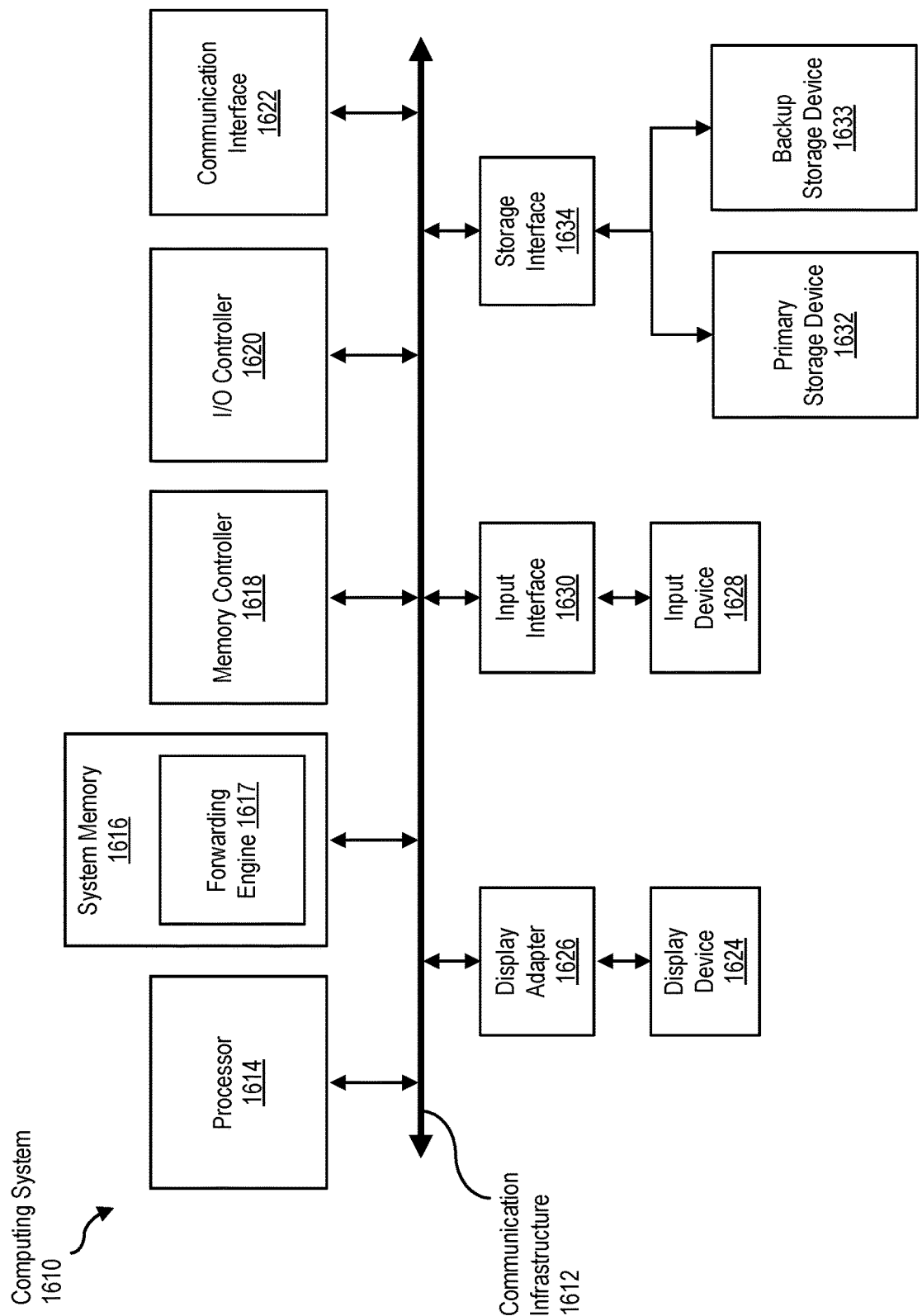
FIG. 16 is a simplified block diagram depicting a computer system suitable for implementing embodiments of the devices and systems described herein.

FIG. 16 depicts a block diagram of a computing system 1610 suitable for implementing aspects of the systems described herein. In the embodiment of FIG. 16, computing system 1610 implements a forwarding engine 1617. Embodiments of the computing system of FIG. 16 can, alternatively or in addition, implement various other engines and modules described in this disclosure. Computing system 1610 broadly represents any single or multi-processor computing device or system capable of executing computer-readable instructions. Examples of computing system 1610 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1610 may include at least one processor 1614 and a system memory 1616. By executing the software that implements a forwarding engine 1617, computing system 1610 becomes a special purpose computing device that is configured to perform message forwarding in manners described elsewhere in this disclosure.

Processor 1614 generally represents any type or form of processing unit capable of processing data or interpreting and executing instructions. In certain embodiments, processor 1614 may receive instructions from a software application or module. These instructions may cause processor 1614 to perform the functions of one or more of the embodiments described and/or illustrated herein. System memory 1616 generally represents any type or form of volatile or non-volatile storage device or medium capable of storing data and/or other computer-readable instructions. Examples of system memory 1616 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 1610 may include both a volatile memory unit (such as, for example, system memory 1616) and a non-volatile storage device (such as, for example, primary storage device 1632, as described further below). In one example, program instructions executable to implement a forwarding engine configured to forward messages using segment routing may be loaded into system memory 1616.

In certain embodiments, computing system 1610 may also include one or more components or elements in addition to processor 1614 and system memory 1616. For example, as illustrated in FIG. 16, computing system 1610 may include a memory controller 1618, an Input/Output (I/O) controller 1620, and a communication interface 1622, each of which may be interconnected via a communication infrastructure 1612. Communication infrastructure 1612 generally represents any type or form of infrastructure capable of facilitating communication between one or more components of a computing device. Examples of communication infrastructure 1612 include, without limitation, a communication bus (such as an Industry Standard Architecture (ISA), Peripheral Component Interconnect (PCI), PCI express (PCIe), or similar bus) and a network.

Memory controller 1618 generally represents any type or form of device capable of handling memory or data or controlling communication between one or more components of computing system 1610. For example, in certain embodiments memory controller 1618 may control communication between processor 1614, system memory 1616, and I/O controller 1620 via communication infrastructure 1612. In certain embodiments, memory controller 1618 may perform and/or be a means for performing, either alone or in combination with other elements, one or more of the operations or features described and/or illustrated herein. I/O controller 1620 generally represents any type or form of module capable of coordinating and/or controlling the input and output functions of a computing device. For example, in certain embodiments I/O controller 1620 may control or facilitate transfer of data between one or more elements of computing system 1610, such as processor 1614, system memory 1616, communication interface 1622, display adapter 1626, input interface 1630, and storage interface 1634.

Communication interface 1622 broadly represents any type or form of communication device or adapter capable of facilitating communication between computing system 1610 and one or more additional devices. For example, in certain embodiments communication interface 1622 may facilitate communication between computing system 1610 and a private or public network including additional computing systems. Examples of communication interface 1622 include, without limitation, a wired network interface (such as a network interface card), a wireless network interface (such as a wireless network interface card), a modem, and any other suitable interface. In at least one embodiment, communication interface 1622 may provide a direct connection to a remote server via a direct link to a network, such as the Internet. Communication interface 1622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1622 may also represent a host adapter configured to facilitate communication between computing system 1610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 1622 may also allow computing system 1610 to engage in distributed or remote computing. For example, communication interface 1622 may receive instructions from a remote device or send instructions to a remote device for execution.

As illustrated in FIG. 16, computing system 1610 may also include at least one display device 1624 coupled to communication infrastructure 1612 via a display adapter 1626. Display device 1624 generally represents any type or form of device capable of visually displaying information forwarded by display adapter 1626. Similarly, display adapter 1626 generally represents any type or form of device configured to forward graphics, text, and other data from communication infrastructure 1612 (or from a frame buffer) for display on display device 1624. Computing system 1610 may also include at least one input device 1628 coupled to communication infrastructure 1612 via an input interface 1630. Input device 1628 generally represents any type or form of input device capable of providing input, either computer or human generated, to computing system 1610. Examples of input device 1628 include, without limitation, a keyboard, a pointing device, a speech recognition device, or any other input device.

As illustrated in FIG. 16, computing system 1610 may also include a primary storage device 1632 and a backup storage device 1633 coupled to communication infrastructure 1612 via a storage interface 1634. Storage devices 1632 and 1633 generally represent any type or form of storage device or medium capable of storing data and/or other computer-readable instructions. For example, storage devices 1632 and 1633 may be a magnetic disk drive (e.g., a so-called hard drive), a floppy disk drive, a magnetic tape drive, an optical disk drive, a flash drive, or the like. Storage interface 1634 generally represents any type or form of interface or device for transferring data between storage devices 1632 and 1633 and other components of computing system 1610. A storage device like primary storage device 1632 can store information such as routing tables and forwarding tables.

In certain embodiments, storage devices 1632 and 1633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1632 and 1633 may also include other similar structures or devices for allowing computer software, data, or other computer-readable instructions to be loaded into computing system 1610. For example, storage devices 1632 and 1633 may be configured to read and write software, data, or other computer-readable information. Storage devices 1632 and 1633 may be a part of computing system 1610 or may in some embodiments be separate devices accessed through other interface systems.

Many other devices or subsystems may be connected to computing system 1610. Conversely, all of the components and devices illustrated in FIG. 16 need not be present to practice the embodiments described and/or illustrated herein. The devices and subsystems referenced above may also be interconnected in different ways from that shown in FIG. 16.

Computing system 1610 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1610 for storage in memory via a network such as the Internet or upon a carrier medium. The computer-readable medium containing the computer program may be loaded into computing system 1610. All or a portion of the computer program stored on the computer-readable medium may then be stored in system memory 1616 and/or various portions of storage devices 1632 and 1633. When executed by processor 1614, a computer program loaded into computing system 1610 may cause processor 1614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1610 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 receiving, at a node in a communications network, a message comprising a message bit array, wherein
 the message bit array identifies egress nodes for the message within a bit indexed explicit replication (BIER) domain of the communications network,
 a first bit position in the message bit array represents a first group of the egress nodes, wherein the first group comprise two or more of the egress nodes,
 a bit value at the first bit position indicates that the message is to be forwarded to one of the egress nodes of the first group,
 the message is received via a forwarding node comprising a routing table that maps the first bit position to the node, and
 no bit positions in the message bit array other than the first bit position are needed for identification of the node using the routing table;
 accessing a first forwarding table entry corresponding to the first bit position;
 determining whether the first bit position is an anycast bit position having multiple corresponding forwarding table entries; and
 based on a result of the determining, forwarding the message to only one of the egress nodes of the first group.

2. The method of claim 1, wherein determining whether the first bit position is an anycast bit position comprises checking a field in the first forwarding table entry.

3. The method of claim 1, wherein determining whether the first bit position is an anycast bit position comprises checking a field in a routing table entry at the node.

4. The method of claim 1, further comprising, if the first bit position is an anycast bit position, selecting a preferred forwarding table entry, from among the multiple corresponding forwarding table entries, for forwarding of the message.

5. The method of claim 4, wherein selecting the preferred forwarding table entry comprises applying a load balancing procedure.

6. The method of claim 4, wherein selecting the preferred forwarding table entry comprises eliminating entries, among the multiple corresponding forwarding table entries, identifying unavailable nodes as neighbor nodes for forwarding.

7. The method of claim 4, wherein forwarding the message to one of the egress nodes comprises forwarding the message according to the preferred forwarding table entry.

8. A network device associated with a node in a communications network, the network device comprising:
 a network interface adapted for data communication within the communications network; and
 a processor operably coupled to the network interface and adapted to
 receive a message comprising a message bit array, wherein
 the message bit array identifies egress nodes for the message within a bit indexed explicit replication (BIER) domain of the communications network,
 a first bit position in the message bit array represents a first group of the egress nodes, wherein the first group comprise two or more of the egress nodes,
 a bit value at the first bit position indicates that the message is to be forwarded to one of the egress nodes of the first group,
 the message is received via a forwarding node comprising a routing table that maps the first bit position to the node, and
 no bit positions in the message bit array other than the first bit position are needed for identification of the node using the routing table,
 access a first forwarding table entry corresponding to the first bit position,
 determine whether the first bit position is an anycast bit position having multiple corresponding forwarding table entries, and
 based on a result of the determining, forward the message to only one of the egress nodes of the first group.

9. The network device of claim 8, wherein the processor is further adapted to check a field in the first forwarding table entry, as a part of determining whether the first bit position is an anycast bit position.

10. The network device of claim 8, further comprising a memory operably coupled to the processor, and wherein the processor is further adapted to check a field in a routing table entry stored in the memory, as a part of determining whether the first bit position is an anycast bit position.

11. The network device of claim 8, wherein the processor is further adapted to, if the first bit position is an anycast bit position, select a preferred forwarding table entry, from among the multiple corresponding forwarding table entries, for forwarding of the message.

12. The network device of claim 11, wherein the processor is further adapted to apply a load balancing procedure, as a part of selecting a preferred forwarding table entry.

13. The network device of claim 11, wherein the processor is further adapted to eliminate entries, among the multiple corresponding forwarding table entries, identifying unavailable nodes as neighbor nodes for forwarding, as a part of selecting a preferred forwarding table entry.

14. The network device of claim 11, where the processor is further adapted to forward the message according to the preferred forwarding table entry, as a part of forwarding the message to one of the egress nodes.

15. A non-transitory computer readable medium, comprising computer readable instructions executable to:
- receive, at a node in a communications network, a message comprising a message bit array, wherein
  - the message bit array identifies egress nodes for the message within a bit indexed explicit replication (BIER) domain of the communications network,
  - a first bit position in the message bit array represents a first group of the egress nodes, wherein the first group comprise two or more of the egress nodes,
  - a bit value at the first bit position indicates that the message is to be forwarded to one of the egress nodes of the first group,
  - the message is received via a forwarding node comprising a routing table that maps the first bit position to the node, and
  - no bit positions in the message bit array other than the first bit position are needed for identification of the node using the routing table;
- access a first forwarding table entry corresponding to the first bit position;
- determine whether the first bit position is an anycast bit position having multiple corresponding forwarding table entries; and
- based on a result of the determining, forward the message to only one of the egress nodes of the first group.

16. The computer readable medium of claim 15, wherein the instructions are further executable to check a field in the first forwarding table entry, as a part of determining whether the first bit position is an anycast bit position.

17. The computer readable medium of claim 15, wherein the instructions are further executable to check a field in a routing table entry stored at the node, as a part of determining whether the first bit position is an anycast bit position.

18. The computer readable medium of claim 15, wherein the instructions are further executable to, if the first bit position is an anycast bit position, select a preferred forwarding table entry, from among the multiple corresponding forwarding table entries, for forwarding of the message.

19. The computer readable medium of claim 18, wherein the instructions are further executable to apply a load balancing procedure, as a part of selecting a preferred forwarding table entry.

20. The computer readable medium of claim 18, wherein the instructions are further executable to forward the message according to the preferred forwarding table entry, as a part of forwarding the message to one of the egress nodes.

* * * * *